(12) United States Patent
Oshima et al.

(10) Patent No.: US 7,524,789 B2
(45) Date of Patent: Apr. 28, 2009

(54) PROCESS FOR PRODUCING MODIFIED PARTICLE, CARRIER OR CATALYST COMPONENT FOR ADDITION POLYMERIZATION, PRE-POLYMERIZED CATALYST COMPONENT THEREFOR, CATALYST THEREFOR, AND ADDITION POLYMER

(75) Inventors: Hideki Oshima, Ichihara (JP); Makoto Satoh, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 40 days.

(21) Appl. No.: 10/934,504

(22) Filed: Sep. 7, 2004

(65) Prior Publication Data
US 2005/0148459 A1 Jul. 7, 2005

(30) Foreign Application Priority Data
Oct. 22, 2003 (JP) .............................. 2003-361620

(51) Int. Cl.
*B01J 31/06* (2006.01)
*B01J 31/14* (2006.01)
*C08F 4/52* (2006.01)

(52) U.S. Cl. ................... 502/103; 502/108; 526/160; 526/348; 526/943

(58) Field of Classification Search .............. 502/103, 502/108; 526/160, 943, 348
See application file for complete search history.

(56) References Cited

U.S. PATENT DOCUMENTS

| | | | |
|---|---|---|---|
| 4,276,399 A | 6/1981 | Rekers et al. | |
| 4,542,199 A | 9/1985 | Kaminsky et al. | |
| 4,808,561 A | 2/1989 | Welborn, Jr. | |
| 4,897,455 A | 1/1990 | Welborn, Jr. | |
| 5,177,043 A * | 1/1993 | Koyama et al. ............. | 502/125 |
| 5,191,052 A | 3/1993 | Welborn, Jr. | |
| 5,391,793 A | 2/1995 | Marks et al. | |
| 6,084,059 A * | 7/2000 | Matsushita et al. .......... | 528/414 |
| 6,100,213 A * | 8/2000 | Kumamoto et al. .......... | 502/120 |
| 6,284,699 B1 * | 9/2001 | Ohgane et al. .............. | 502/103 |
| 6,333,388 B1 * | 12/2001 | Kumamoto et al. ......... | 526/153 |
| 6,355,594 B1 * | 3/2002 | McDaniel et al. ........... | 502/152 |
| 6,475,945 B1 * | 11/2002 | Carnahan et al. ............. | 502/87 |
| 6,482,765 B1 * | 11/2002 | Ohgane et al. .............. | 502/104 |
| 6,528,596 B2 * | 3/2003 | Takaoki et al. .............. | 526/113 |
| 6,613,852 B2 * | 9/2003 | McDaniel et al. ........... | 526/160 |
| 6,841,503 B2 * | 1/2005 | Fujiwara et al. ............. | 502/128 |
| 6,870,015 B2 * | 3/2005 | Oshima et al. .............. | 526/114 |
| 6,936,667 B2 * | 8/2005 | Jensen et al. ................ | 526/116 |
| 2003/0069127 A1 * | 4/2003 | Takaoki et al. .............. | 502/108 |

FOREIGN PATENT DOCUMENTS

| | | |
|---|---|---|
| EP | 0 277 004 A1 | 8/1988 |
| EP | 1 114 832 A1 | 7/2001 |
| EP | 1 342 734 A1 | 9/2003 |
| JP | 58-19309 A | 2/1983 |
| JP | 61-296008 A | 12/1986 |
| JP | 1-502036 A | 7/1989 |
| JP | 5-320248 A | 12/1993 |
| JP | 9-249707 A | 9/1997 |
| JP | 10-17617 A | 1/1998 |
| JP | 11-12319 A | 1/1999 |
| JP | 11-343306 A | 12/1999 |
| JP | 3196419 B2 | 6/2001 |

* cited by examiner

*Primary Examiner*—David M Brunsman
(74) *Attorney, Agent, or Firm*—Sughrue Mion, PLLC

(57) ABSTRACT

A process for producing a modified particle, a carrier or a catalyst component for addition polymerization, which comprises the steps of (1) contacting a compound (a) represented by the defined formula $M^1L^1_3$ with a compound (b) represented by the defined formula $R^1_{t-1}TH$, thereby producing a contact product, and (2) contacting the contact product with a porous particle (d) and then with a compound (c) represented by the defined formula $R^2_{t-2}TH_2$; a process for producing a pre-polymerized catalyst component or a catalyst for addition polymerization, which comprises the steps of (1) contacting the above modified particle with a transition metal compound and optionally an organoaluminum compound, thereby producing a primary catalyst, and (2) pre-polymerizing an olefin in the presence of the primary catalyst; a process for producing a catalyst for addition polymerization, which comprises the step of contacting the above catalyst component with a transition metal compound and optionally an organoaluminum compound; and a process for producing an addition polymer, which comprises the step of addition polymerizing an addition polymerizable monomer in the presence of the above catalyst.

22 Claims, No Drawings

PROCESS FOR PRODUCING MODIFIED PARTICLE, CARRIER OR CATALYST COMPONENT FOR ADDITION POLYMERIZATION, PRE-POLYMERIZED CATALYST COMPONENT THEREFOR, CATALYST THEREFOR, AND ADDITION POLYMER

FIELD OF THE INVENTION

The present invention relates to a process for producing a modified particle, a carrier or a catalyst component for addition polymerization; a process for producing a pre-polymerized catalyst component for addition polymerization; a process for producing a catalyst for addition polymerization; and a process for producing an addition polymer.

BACKGROUND OF THE INVENTION

Examples of a single site catalyst for polymerizing an addition polymerizable monomer such as an olefin are:

(1) a catalyst using a combination of bis(cyclopentadienyl) zirconium dichloride with methylaluminoxane (JP 58-19309A), (2) a catalyst using a combination of bis(cyclopentadienyl) zirconium dichloride with a specific boron compound (JP 58-19309A), (3) a catalyst using a combination of bis(cyclopentadienyl) zirconium dimethyl with tri(n-butyl)ammonium tetraxis (pentafluorophenyl)borate (JP 1-502036W), (4) a single site catalyst, which lowers slightly homogeneity of an addition polymer obtained (JP 5-320248A, JP 10-17617A, JP 11-12319A and JP 11-343306A), and (5) a catalyst using a specific particle as one of catalyst components (JP 61-296008A and JP 9-249707A).

However, these single site catalysts cannot produce an addition polymer having a satisfactorily high molecular weight in addition polymerized particle-producing polymerization such as slurry polymerization, gas phase polymerization and bulk polymerization. Here, the term "addition polymerized particle-producing polymerization" means polymerization producing a polymer particle by polymerizing an addition polymerizable monomer.

SUMMARY OF THE INVENTION

An object of the present invention is to provide, in addition polymerized particle-producing polymerization:

(1) a process for producing an addition polymer having a satisfactorily high molecular weight, (2) a process for producing a catalyst for addition polymerization used for producing said addition polymer, (3) a process for producing a modified particle, a carrier or a catalyst component for addition polymerization used for producing said catalyst for addition polymerization, and (4) a process for producing a pre-polymerized catalyst component for addition polymerization used for producing said catalyst for addition polymerization.

The present invention is a process for producing a modified particle, a carrier or a catalyst component for addition polymerization, which comprises the steps of:

(1) contacting a compound (a) represented by the following formula [1] with a compound (b) represented by the following formula [2], thereby producing a contact product, and (2) contacting the contact product with a compound (c) represented by the following formula [3] in the presence of a particle (d), $$M^1 L^1_3 \quad [1],$$

$$R^1_{t-1}TH \quad [2] \text{ and}$$

$$R^2_{t-2}TH_2 \quad [3],$$

wherein $M^1$ is an atom of Group 13 in the periodic table; $L^1$ is a hydrogen atom, a hydrocarbon group or a halogen atom, and three $L^1$s are the same as or different from one another; $R^1$ is an electron-withdrawing group or an electron-withdrawing group-containing group, and when more than one $R^1$ exist, they are the same as or different from one another; $R^2$ is a hydrocarbon group or a halogenated hydrocarbon group; T is independently of each other a non-metal atom of Group 15 or 16 in the periodic table; and t is a number corresponding to the valence of T. Said process is hereinafter referred to as "process-1".

Also, the present invention is a process for producing a pre-polymerized catalyst component or a catalyst for addition polymerization, which comprises the steps of:

(1) contacting a modified particle (A) produced by the above-mentioned process-1 with a transition metal compound (B) and optionally an organoaluminum compound (C), thereby producing a primary catalyst, and (2) pre-polymerizing an olefin in the presence of the primary catalyst. Said process is hereinafter referred to as "process-2".

Further, the present invention is a process for producing a catalyst for addition polymerization, which comprises the step of contacting a modified particle (A) produced by the above-mentioned process-1 with a transition metal compound (B) and optionally an organoaluminum compound (C). Said process is hereinafter referred to as "process-3".

Still further, the present invention is a process for producing a catalyst for addition polymerization, which comprises the step of contacting a pre-polymerized catalyst component for addition polymerization produced by the above-mentioned process-2 with an organoaluminum compound (C). Said process is hereinafter referred to as "process-4".

Further, the present invention is a process for producing an addition polymer, which comprises the step of addition polymerizing an addition polymerizable monomer in the presence of a catalyst for addition polymerization produced by any of the above-mentioned processes-2 to 4. Said process is hereinafter referred to as "process-5".

DETAILED DESCRIPTION OF THE INVENTION (A) Modified Particle, Carrier or Catalyst Component for Addition Polymerization Examples of $M^1$ in the above formula [1] are a boron atom, an aluminum atom, a gallium atom, an indium atom and a thallium atom. Among them, a boron atom or an aluminum atom is preferable, and an aluminum atom is particularly preferable.

Examples of the halogen atom of $L^1$ in the above formula [1] are a fluorine atom, a chlorine atom, a bromine atom and an iodine atom. A preferable hydrocarbon group of $L^1$ therein is an alkyl group, an aryl group or an aralkyl group.

The above-mentioned alkyl group of $L^1$ is preferably an alkyl group having 1 to 20 carbon atoms. Examples thereof are a methyl group, an ethyl group, a n-propyl group, an isopropyl group, a n-butyl group, a sec-butyl group, a tert-butyl group, an isobutyl group, a n-pentyl group, a neopentyl group, a n-hexyl group, a n-heptyl group, a n-octyl group, a n-decyl group, a n-dodecyl group, a n-pentadecyl group and a n-eicosyl group. More preferred is a methyl group, an ethyl group, an isopropyl group, a tert-butyl group or an isobutyl group.

One or more hydrogen atoms contained in the above-mentioned alkyl groups may be substituted with a halogen atom such as a fluorine atom, a chlorine atom, a bromine atom and an iodine atom. Examples of an alkyl group having 1 to 20 carbon atoms, whose one or more hydrogen atoms are substituted with a halogen atom, are a fluoromethyl group, a difluoromethyl group, a trifluoromethyl group, a fluoroethyl group, a difluoroethyl group, a trifluoroethyl group, a tetrafluoroethyl group, a pentafluoroethyl group, a perfluoropropyl group, a perfluorobutyl group, a perfluoropentyl group, a perfluorohexyl group, a perfluorooctyl group, a perfluorododecyl group, a perfluoropentadecyl group, a perfluoroeicosyl group, a 1H, 1H-perfluoropropyl group, a 1H, 1H-perfluorobutyl group, a 1H, 1H-perfluoropentyl group, a 1H, 1H-perfluorohexyl group, a 1H, 1H-perfluorooctyl group, a 1H, 1H-perfluorododecyl group, a 1H, 1H-perfluoropentadecyl group and a 1H, 1H-perfluoroeicosyl group; and alkyl groups obtained by changing the term "fluoro" contained in the above-mentioned alkyl groups to the term "chloro", "bromo" or "iodo".

The above-mentioned aryl group of $L^1$ is preferably an aryl group having 6 to 20 carbon atoms. Examples thereof are a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, an isobutylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group and an anthracenyl group, and more preferred is a phenyl group.

One or more hydrogen atoms contained in the above-mentioned aryl groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

The above-mentioned aralkyl group of $L^1$ is preferably an aralkyl group having 7 to 20 carbon atoms. Examples thereof are a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (3,5-dimethylphenyl)methyl group, a (2,3,4-trimethylphenyl)methyl group, a (2,3,5-trimethylphenyl)methyl group, a (2,3,6-trimethylphenyl)methyl group, a (3,4,5-trimethylphenyl)methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl)methyl group, a (sec-butylphenyl)methyl group, a (tert-butylphenyl)methyl group, an (isobutylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a naphthylmethyl group and an anthracenylmethyl group, and more preferred is a benzyl group.

One or more hydrogen atoms contained in the above-mentioned aralkyl groups may be substituted with a halogen atom such as a fluorine atom, a chlorine atom, a bromine atom and an iodine atom.

$L^1$ in the above formula [1] is preferably a hydrogen atom, an alkyl group, an aryl group or a halogen atom, more preferably a hydrogen atom, an alkyl group or a halogen atom, further preferably an alkyl group, particularly preferably a methyl group, an ethyl group, an isobutyl group or a n-octyl group, and most preferably an ethyl group.

Examples of the non-metal atom of Group 15 of T in the above formulas [2] and [3] are a nitrogen atom and a phosphorous atom, and examples of the non-metal atom of the Group 16 of T therein are an oxygen atom and a sulfur atom. T is preferably a nitrogen atom or an oxygen atom, and particularly preferably an oxygen atom.

In the above formulas [2] and [31], when T is a non-metal atom of Group 15, t is 3, and when T is a non-metal atom of Group 16, t is 2.

As an index of the electron-withdrawing property of $R^1$ in the above formula [2], there is known a substituent constant σ in the Hammet's rule. As the electron-withdrawing group, there can be exemplified a functional group whose substituent constant σ is positive.

Examples of the electron-withdrawing group of $R^1$ are a fluorine atom, a chlorine atom, a bromine atom, an iodine atom, a cyano group, a nitro group, a carbonyl group, a sulfone group and a phenyl group. Examples of the electron-withdrawing group-containing group of $R^1$ (namely, examples of a group containing the electron-withdrawing group of $R^1$) are a halogenated alkyl group, a halogenated aryl group, a (halogenated alkyl)aryl group, a cyanated aryl group, a nitrated aryl group, an ester group (for example, an alkoxycarbonyl group, an aralkyloxycarbonyl group and an aryloxycarbonyl group), an acyl group and a halogenated acyl group.

Examples of the above-mentioned halogenated alkyl group are a fluoromethyl group, a difluoromethyl group, a trifluoromethyl group, a 2,2,2-trifluoroethyl group, a 2,2,3,3,3-pentafluoropropyl group, a 2,2,2-trifluoro-1-trifluoromethylethyl group, a 1,1-bis(trifluoromethyl)-2,2,2-trifluoroethyl group, a 1H, 1H-perfluorobutyl group, a 1H, 1H-perfluoropentyl group, a 1H, 1H-perfluorohexyl group, a 1H, 1H-perfluorooctyl group, a 1H, 1H-perfluorododecyl group, a 1H, 1H-perfluoropentadecyl group and a 1H, 1H-perfluoroeicosyl group; and halogenated alkyl groups obtained by changing the term "fluoro" contained in the above-mentioned halogenated alkyl groups to the term "chloro", "bromo" or "iodo".

Examples of the above-mentioned halogenated aryl group are a 2-fluorophenyl group, a 3-fluorophenyl group, a 4-fluorophenyl group, a 2,4-difluorophenyl group, a 2,6-difluorophenyl group, a 3,4-difluorophenyl group, a 3,5-difluorophenyl group, a 2,4,6-trifluorophenyl group, a 3,4,5-trifluorophenyl group, a 2,3,5,6-tetrafluorophenyl group, a pentafluorophenyl group, a 2,3,5,6-tetrafluoro-4-trifluoromethylphenyl group, a 2,3,5,6-tetrafluoro-4-pentafluorophenylphenyl group, a perfluoro-1-naphthyl group, a perfluoro-2-naphthyl group and a 4,5,6,7,8-pentafluoro-2-naphthyl group; and halogenated aryl groups obtained by changing the term "fluoro" contained in the above-mentioned halogenated aryl groups to the term "chloro", "bromo" or "iodo".

Examples of the above-mentioned (halogenated alkyl)aryl group are a 2-(trifluoromethyl)phenyl group, a 3-(trifluoromethyl)phenyl group, a 4-(trifluoromethyl)phenyl group, a 2,6-bis(trifluoromethyl)phenyl group, a 3,5-bis(trifluoromethyl) phenyl group, and a 2,4,6-tris(trifluoromethyl)phenyl group; and (halogenated alkyl)aryl groups obtained by changing the term "fluoro" contained in the above-mentioned (halogenated alkyl)aryl groups to the term "chloro", "bromo" or "iodo".

Examples of the above-mentioned cyanated aryl group are a 2-cyanophenyl group, a 3-cyanophenyl group and a 4-cyanophenyl group.

Examples of the above-mentioned nitrated aryl group are a 2-nitrophenyl group, a 3-nitrophenyl group and a 4-nitrophenyl group.

Examples of the above-mentioned ester group are a methoxycarbonyl group, an ethoxycarbonyl group, a n-propoxycarbonyl group, an isopropoxycarbonyl group, a phenoxycarbonyl group, a trifluoromethoxycarbonyl group and a pentafluorophenoxycarbonyl group.

Examples of the above-mentioned acyl group are a formyl group, an ethanoyl group, a propanoyl group, a butanoyl group, a trifluoroethanoyl group, a benzoyl group, a pentafluorobenzoyl group, a perfluoroethanoyl group, a perfluoropropanoyl group, a perfluorobutanoyl group, a perfluoropentanoyl group, a perfluorohexanoyl group, a perfluoroheptanoyl group, a perfluorooctanoyl group, a perfluorononanoyl group, a perfluorodecanoyl group, a perfluoroundecanoyl group and a perfluorododecanoyl group.

$R^1$ in the formula [2] is preferably a halogenated hydrocarbon group; more preferably a halogenated alkyl group or a halogenated aryl group; further preferably a fluoromethyl group, a difluoromethyl group, a trifluoromethyl group, a 2,2,2-trifluoroethyl group, a 2,2,3,3,3-pentafluoropropyl group, a 2,2,2-trifluoro-1-trifluoromethylethyl group, a 1,1-bis(trifluoromethyl)-2,2,2-trifluoroethyl group, a 2-fluorophenyl group, a 3-fluorophenyl group, a 4-fluorophenyl group, a 2,4-difluorophenyl group, a 2,6-difluorophenyl group, a 3,4-difluorophenyl group, a 3,5-difluorophenyl group, a 2,4,6-trifluorophenyl group, a 3,4,5-trifluorophenyl group, a 2,3,5,6-tetrafluorophenyl group, a pentafluorophenyl group, a 2,3,5,6-tetrafluoro-4-trifluoromethylphenyl group, a 2,3,5,6-tetrafluoro-4-pentafluorophenylphenyl group, a perfluoro-1-naphtyl group, a perfluoro-2-naphtyl group, a 4,5,6,7,8-pentafluoro-2-naphtyl group, a chloromethyl group, a dichloromethyl group, a trichloromethyl group, a 2,2,2-trichloroethyl group, a 2,2,3,3,3-pentachloropropyl group, a 2,2,2-trichloro-1-trichloromethylethyl group, a 1,1-bis(trichloromethyl)-2,2,2-trichloroethyl group, a 4-chlorophenyl group, a 2,6-dichlorophenyl group, a 3,5-dichlorophenyl group, a 2,4,6-trichlorophenyl group, a 3,4,5-trichlorophenyl group or a pentachlorophenyl group; particularly preferably a fluoroalkyl group or a fluoroaryl group; and most preferably a trifluoromethyl group, a 2,2,2-trifluoro-1-trifluoromethylethyl group, a 1,1-bis(trifluoromethyl)-2,2,2-trifluoroethyl group, a 3,5-difluorophenyl group, a 3,4,5-trifluorophenyl group or a pentafluorophenyl group.

The hydrocarbon group of $R^2$ in the above-mentioned formula [3] is preferably an alkyl group, an aryl group or an aralkyl group, and examples thereof are those exemplified for $L^1$ in the above-mentioned formula [1]. Examples of the halogenated hydrocarbon group of $R^2$ are a halogenated alkyl group, a halogenated aryl group and a (halogenated alkyl)aryl group, and specific examples thereof are those exemplified for the electron-withdrawing group of $R^1$ in the above-mentioned formula [2].

$R^2$ in the above-mentioned formula [3] is preferably a halogenated hydrocarbon group, and further preferably a fluorinated hydrocarbon group.

Examples of the compound (a) having an aluminum atom as $M^1$ are a trialkylaluminum such as trimethylaluminum, triethylaluminum, tripropylaluminum, tri-n-butylaluminum, triisobutylaluminum, tri-n-hexylaluminum and tri-n-octylaluminum; a triarylaluminum such as triphenylaluminum, trinaphthylaluminum and tri(pentafluorophenyl)aluminum; a trialkenylaluminum such as triallylaluminum; tri(cyclopentadienyl)aluminum; a dialkylaluminum halide such as dimethylaluminum chloride, diethylaluminum chloride, dipropylaluminum chloride, di-n-butylaluminum chloride, diisobutylaluminum chloride, di-n-hexylaluminum chloride, dimethylaluminum bromide, diethylaluminum bromide, dipropylaluminum bromide, di-n-butylaluminum bromide, diisobutylaluminum bromide, di-n-hexylaluminum bromide, dimethylaluminum iodide, diethylaluminum iodide, dipropylaluminum iodide, di-n-butylaluminum iodide, diisobutylaluminum iodide and di-n-hexylaluminum iodide; an alkylaluminum dihalide such as methylaluminum dichloride, ethylaluminum dichloride, propylaluminum dichloride, n-butylaluminum dichloride, isobutylaluminum dichloride, n-hexylaluminum dichloride, n-octylaluminum dichloride, methylaluminum dibromide, ethylaluminum dibromide, propylaluminum dibromide, n-butylaluminum dibromide, isobutylaluminum dibromide, n-hexylaluminum dibromide, n-octylaluminum dibromide, methylaluminum diiodide, ethylaluminum diiodide, propylaluminum diiodide, n-butylaluminum diiodide, isobutylaluminum diiodide, n-hexylaluminum diiodide and n-octylaluminum diiodide; and an aluminum trihalide such as aluminum trifluoride, aluminum trichloride, aluminum tribromide and aluminum triiodide.

The compound (a) is preferably a trialkylaluminum, further preferably trimethylaluminum, triethylaluminum, tripropylaluminum, tri-n-butylaluminum, triisobutylaluminum, tri-n-hexylaluminum or tri-n-octylaluminum, and particularly preferably trimethylaluminum, triethylaluminum, triisobutylaluminum or tri-n-octylaluminum. Among them, triethylaluminum is preferably used.

Examples of amines of the compound (b) are di(fluoromethyl)amine, di(chloromethyl)amine, di(bromomethyl)amine, di(iodomethyl)amine, bis(difluoromethyl)amine, bis(dichloromethyl)amine, bis(dibromomethyl)amine, bis(diiodomethyl)amine, bis(trifluoromethyl)amine, bis(trichloromethyl)amine, bis(tribromomethyl)amine, bis(triiodomethyl)amine, bis (2,2,2-trifluoroethyl)amine, bis(2,2,2-trichloroethyl)amine, bis(2,2,2-tribromoethyl)amine, bis(2,2,2-triiodoethyl)amine, bis(2,2,3,3,3-pentafluoropropyl)amine, bis(2,2,3,3,3-pentachloropropyl)amine, bis(2,2,3,3,3-pentabromopropyl)amine, bis(2,2,3,3,3-pentaiodopropyl)amine, bis(2,2,2-trifluoro-1-trifluoromethylethyl)amine, bis(2,2,2-trichloro-1-trichloromethylethyl)amine, bis(2,2,2-tribromo-1-tribromomethylethyl)amine, bis(2,2,2-triiodo-1-triiodomethylethyl)amine, bis(1,1-bis(trifluoromethyl)-2,2,2-trifluoroethyl)amine, bis(1,1-bis(trichloromethyl)-2,2,2-trichloroethyl)amine, bis(1,1-bis(tribromomethyl)-2,2,2-tribromoethyl)amine, bis(1,1-bis(triiodomethyl)-2,2,2-triiodoethyl)amine, bis(2-fluorophenyl)amine, bis(3-fluorophenyl)amine, bis(4-fluorophenyl)amine, bis(2-chlorophenyl)amine, bis(3-chlorophenyl)amine, bis(4-chlorophenyl)amine, bis(2-bromophenyl)amine, bis(3-bromophenyl)amine, bis(4-bromophenyl)amine, bis(2-iodophenyl)amine, bis(3-iodophenyl)amine, bis(4-iodophenyl)amine, bis(2,6-difluorophenyl)amine, bis(3,5-difluorophenyl)amine, bis(2,6-dichlorophenyl)amine, bis(3,5-dichlorophenyl)amine, bis(2,6-dibromophenyl)amine, bis (3,5-dibromophenyl)amine, bis(2,6-diiodophenyl)amine, bis(3,5-diiodophenyl)amine, bis(2,4,6-trifluorophenyl)amine, bis(2,4,6-trichlorophenyl)amine, bis(2,4,6-tribromophenyl) amine, bis(2,4,6-triiodophenyl)amine, bis(3,4,5-trifluorophenyl)amine, bis(3,4,5-trichlorophenyl)amine, bis(3,4,5-tribromophenyl)amine, bis(3,4,5-triiodophenyl)amine, bis (pentafluorophenyl)amine, bis(pentachlorophenyl)amine, bis(pentabromophenyl)amine, bis(pentaiodophenyl)amine, bis(2-(trifluoromethyl)phenyl)amine, bis(3-(trifluoromethyl)phenyl)amine, bis(4-(trifluoromethyl)phenyl)amine, bis(2,6-di(trifluoromethyl)phenyl)amine, bis(3,5-di(trifluoromethyl)phenyl)amine, bis(2,4,6-tri(trifluoromethyl)phenyl)amine, bis(2-cyanophenyl)amine, bis(3-cyanophenyl) amine, bis(4-cyanophenyl)amine, bis(2-nitrophenyl)amine, bis(3-nitrophenyl)amine, bis(4-nitrophenyl)amine, bis(1H, 1H-perfluorobutyl)amine, bis(1H, 1H-perfluoropentyl) amine, bis(1H, 1H-perfluorohexyl)amine, bis(1H, 1H-perfluorooctyl)amine, bis(1H, 1H-perfluorododecyl)amine, bis (1H, 1H-perfluoropentadecyl)amine, bis(1H, 1H-perfluoroeicosyl)amine, bis(1H, 1H-perchlorobutyl) amine, bis(1H, 1H-perchloropentyl)amine, bis(1H, 1H-perchlorohexyl)amine, bis(1H, 1H-perchlorooctyl)amine, bis (1H, 1H-perchlorododecyl)amine, bis(1H, 1H-perchloropentadecyl)amine, bis(1H, 1H-perchloroeicosyl)amine, bis(1H, 1H-perbromobutyl)amine, bis(1H, 1H-perbromopentyl)amine, bis(1H, 1H-perbromohexyl) amine, bis(1H, 1H-perbromooctyl)amine, bis(1H, 1H-perbromododecyl)amine, bis(1H, 1H-perbromopentadecyl) amine and bis(1H, 1H-perbromoeicosyl)amine; and phosphine compounds obtained by changing the nitrogen atom contained in each of the above-mentioned amines to a phosphorus atom, each of which phosphine compounds has a name obtained by changing the term "amine" contained in each of the above-mentioned amines to the term "phosphine".

Further examples of the compound (b) are alcohols such as fluoromethanol, chloromethanol, bromomethanol, iodomethanol, difluoromethanol, dichloromethanol, dibromomethanol, diiodomethanol, trifluoromethanol, trichloromethanol, tribromomethanol, triiodomethanol, 2,2,2-trifluoroethanol, 2,2,2-trichloroethanol, 2,2,2-tribromoethanol, 2,2,2-triiodoethanol, 1,1,1,3,3,3-hexafluoro-2-propanol, 1,1,1,3,3,3-hexachloro-2-propanol, 1,1,1,3,3,3-hexabromo-2-propanol, 1,1,1,3,3,3-hexaiodo-2-propanol, 1,1,1,3,3,3-hexafluoro-2-(trifluoromethyl)-2-propanol, 1,1,1,3,3,3-hexachloro-2-(trichloromethyl)-2-propanol, 1,1,1,3,3,3-hexabromo-2-(tribromomethyl)-2-propanol, 1,1,1,3,3,3-hexaiodo-2-(triiodomethyl)-2-propanol, 1H, 1H, 3H-perfluoropropanol, 1H, 1H, 3H-perchloropropanol, 1H, 1H, 3H-perbromopropanol, 1H, 1H, 3H-periodopropanol, 1H, 1H-perfluoropropanol, 1H, 1H-perchloropropanol, 1H, 1H-perbromopropanol, 1H, 1H-periodopropanol, 1H, 1H, 4H-perfluorobutanol, 1H, 1H, 4H-perchlorobutanol, 1H, 1H, 4H-perbromobutanol, 1H, 1H, 4H-periodobutanol, 1H, 1H-perfluorobutanol, 1H, 1H-perchlorobutanol, 1H, 1H-perbromobutanol, 1H, 1H-periodobutanol, 1H, 1H, 5H-perfluoropentanol, 1H, 1H, 5H-perchloropentanol, 1H, 1H, 5H-perbromopentanol, 1H, 1H, 5H-periodopentanol, 1H, 1H-perfluoropentanol, 1H, 1H-perchloropentanol, 1H, 1H-perbromopentanol, 1H, 1H-periodopentanol, 1H, 1H, 6H-perfluorohexanol, 1H, 1H, 6H-perchlorohexanol, 1H, 1H, 6H-perbromohexanol, 1H, 1H, 6H-periodohexanol, 1H, 1H-perfluorohexanol, 1H, 1H-perchlorohexanol, 1H, 1H-perbromohexanol, 1H, 1H-periodohexanol, 1H, 1H, 8H-perfluorooctanol, 1H, 1H, 8H-perchlorooctanol, 1H, 1H, 8H-perbromooctanol, 1H, 1H, 8H-periodooctanol, 1H, 1H-perfluorooctanol, 1H, 1H-perchlorooctanol, 1H, 1H-perbromooctanol and 1H, 1H-periodooctanol; and thiol compounds obtained by changing the oxygen atom contained in each of the above-mentioned alcohols to a sulfur atom, each of which thiol compounds has a name obtained by changing the term "ol" contained in each of the above-mentioned alcohols to the term "thiol".

Still further examples of the compound (b) are phenols such as 2-fluorophenol, 3-fluorophenol, 4-fluorophenol, 2,4-difluorophenol, 2,6-difluorophenol, 3,4-difluorophenol, 3,5-difluorophenol, 2,4,6-trifluorophenol, 3,4,5-trifluorophenol, 2,3,5,6-tetrafluorophenol, pentafluorophenol, 2,3,5,6-tetrafluoro-4-trifluoromethylphenol, 2,3,5,6-tetrafluoro-4-pentafluorophenylphenol, perfluoro-1-naphthol, perfluoro-2-naphthol, 4,5,6,7,8-pentafluoro-2-naphthol, 2-chlorophenol, 3-chlorophenol, 4-chlorophenol, 2,4-dichlorophenol, 2,6-dichlorophenol, 3,4-dichlorophenol, 3,5-dichlorophenol, 2,4,6-trichlorophenol, 3,4,5-trichlorophenol, 2,3,5,6-tetrachlorophenol, pentachlorophenol, 2,3,5,6-tetrachloro-4-trichloromethylphenol, 2,3,5,6-tetrachloro-4-pentachlorophenylphenol, perchloro-1-naphthol, perchloro-2-naphthol, 4,5,6,7,8-pentachloro-2-naphthol, 2-bromophenol, 3-bromophenol, 4-bromophenol, 2,4-dibromophenol, 2,6-dibromophenol, 3,4-dibromophenol, 3,5-dibromophenol, 2,4,6-tribromophenol, 3,4,5-tribromophenol, 2,3,5,6-tetrabromophenol, pentabromophenol, 2,3,5,6-tetrabromo-4-tribromomethylphenol, 2,3,5,6-tetrabromo-4-pentabromophenylphenol, perbromo-1-naphthol, perbromo-2-naphthol, 4,5,6,7,8-pentabromo-2-naphthol, 2-iodophenol, 3-iodophenol, 4-iodophenol, 2,4-diiodophenol, 2,6-diiodophenol, 3,4-diiodophenol, 3,5-diiodophenol, 2,4,6-triiodophenol, 3,4,5-triiodophenol, 2,3,5,6-tetraiodophenol, pentaiodophenol, 2,3,5,6-tetraiodo-4-triiodomethylphenol, 2,3,5,6-tetraiodo-4-pentaiodophenylphenol, periodo-1-naphthol, periodo-2-naphthol, 4,5,6,7,8-pentaiodo-2-naphthol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl)phenol, 2-cyanophenol, 3-cyanophenol, 4-cyanophenol, 2-nitrophenol, 3-nitrophenol and 4-nitrophenol; and thiophenol compounds obtained by changing the oxygen atom contained in each of the above-mentioned phenols to a sulfur atom, each of which thiophenol compounds has a name obtained by changing the term "phenol" contained in each of the above-mentioned phenols to the term "thiophenol"; and naphthylthiol compounds obtained by changing the oxygen atom contained in each of the above-mentioned naphtols to a sulfur atom, each of which naphthylthiol compounds has a name obtained by changing the term "naphthol" contained in each of the above-mentioned naphtols to the term "naphthylthiol".

Further examples of the compound (b) are halogenated carboxylic acids such as pentafluorobenzoic acid, perfluoroethanoic acid, perfluoropropanoic acid, perfluorobutanoic acid, perfluoropentanoic acid, perfluorohexanoic acid, perfluoroheptanoic acid, perfluorooctanoic acid, perfluorononanoic acid, perfluorodecanoic acid, perfluoroundecanoic acid and perfluorododecanoic acid.

A preferable amine of the compound (b) is bis(trifluoromethyl)amine, bis(2,2,2-trifluoroethyl)amine, bis(2,2,3,3,3-pentafluoropropyl)amine, bis(2,2,2-trifluoro-1-trifluoromethylethyl)amine, bis(1,1-bis(trifluoromethyl)-2,2,2-trifluoroethyl)amine or bis(pentafluorophenyl)amine; a preferable alcohol thereof is trifluoromethanol, 2,2,2-trifluoroethanol, 1,1,1,3,3,3-hexafluoro-2-propanol, 1,1,1,3,3,3-hexafluoro-2-(trifluoromethyl)-2-propanol, 1H, 1H, 6H-perfluorohexanol, 1H, 1H-perfluorohexanol, 1H, 1H, 8H-perfluorooctanol or 1H, 1H-perfluorooctanol; and a preferable phenol thereof is 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol or 2,4,6-tris(trifluoromethyl)phenol.

The compound (b) is more preferably bis(trifluoromethyl)amine, bis(pentafluorophenyl)amine, trifluoromethanol, 1,1,1,3,3,3-hexafluoro-2-propanol, 1,1,1,3,3,3-hexafluoro-2-(trifluoromethyl)-2-propanol, 2,6-difluorophenol, 3,5-difluorophenol, 2,4,6-trifluorophenol, 3,4,5-trifluorophenol, pentafluorophenol, 4-(trifluoromethyl)phenol, 2,6-bis(trifluoromethyl)phenol or 2,4,6-tris(trifluoromethyl)phenol; and further preferably 1,1,1,3,3,3-hexafluoro-2-propanol, 1,1,1,3,3,3-hexafluoro-2-(trifluoromethyl)-2-propanol, 3,5-difluorophenol, 3,4,5-trifluorophenol or pentafluorophenol.

Examples of the compound (c) are water, hydrogen sulfide, an alkylamine, an arylamine, an aralkylamine, a halogenated alkylamine, a halogenated arylamine and a (halogenated alkyl)arylamine.

Examples of amines of the compound (c) are methylamine, ethylamine, n-propylamine, isopropylamine, n-butylamine, sec-butylamine, tert-butylamine, isobutylamine, n-pentylamine, neopentylamine, isopentylamine, n-hexylamine, n-octylamine, n-decylamine, n-dodecylamine, n-pentadecylamine, n-eicosylamine, allylamine, cyclopentadienylamine, 2-tolylamine, 3-tolylamine, 4-tolylamine, 2,3-xylylamine, 2,4-xylylamine, 2,5-xylylamine, 2,6-xylylamine, 3,4-xylylamine, 3,5-xylylamine, naphthylamine, anthracenylamine, benzylamine, (2-methylphenyl)methylamine, (3-methylphenyl)methylamine, (4-methylphenyl)methylamine, (2,3-dimethylphenyl)methylamine, (2,4-dimethylphenyl)methylamine, (2,5-dimethylphenyl)methylamine, (2,6-dimethylphenyl)methylamine, (3,4-dimethylphenyl)methylamine, (3,5-dimethylphenyl)methylamine, (2,3,4-trimethylphenyl)methylamine, (2,3,5-trimethylphenyl)methylamine, (2,3,6-trimethylphenyl)methylamine, (3,4,5-trimethylphenyl)methylamine, (2,4,6-trimethylphenyl)methylamine, (2,3,4,5-tetramethylphenyl)methylamine, (2,3,4,6-tetramethylphenyl)methylamine, (2,3,5,6-tetramethylphenyl)methylamine, (pentamethylphenyl)methylamine, (ethylphenyl)methylamine, (n-propylphenyl)methylamine, (isopropylphenyl)methylamine, (n-butylphenyl)methylamine, (sec-butylphenyl)methylamine, (tert-butylphenyl)methylamine, (n-pentylphenyl)methylamine, (neopentylphenyl)methylamine, (n-hexylphenyl)methylamine, (n-octylphenyl)methylamine, (n-decylphenyl)methylamine, (n-tetradecylphenyl)methylamine, naphtylmethylamine, anthracenylmethylamine, fluoromethylamine, chloromethylamine, bromomethylamine, iodomethylamine, difluoromethylamine, dichloromethylamine, dibromomethylamine, diiodomethylamine, trifluoromethylamine, trichloromethylamine, tribromomethylamine, triiodomethylamine, 2,2,2-trifluoroethylamine, 2,2,2-trichloroethylamine, 2,2,2-tribromoethylamine, 2,2,2-triiodoethylamine, 2,2,3,3,3-pentafluoropropylamine, 2,2,3,3,3-pentachloropropylamine, 2,2,3,3,3-pentabromopropylamine, 2,2,3,3,3-pentaiodopropylamine, 2,2,2-trifluoro-1-trifluoromethylethylamine, 2,2,2-trichloro-1-trichloromethylethylamine, 2,2,2-tribromo-1-tribromomethylethylamine, 2,2,2-triiodo-1-triiodomethylethylamine, 1,1-bis(trifluoromethyl)-2,2,2-trifluoroethylamine, 1,1-bis(trichloromethyl)-2,2,2-trichloroethylamine, 1,1-bis(tribromomethyl)-2,2,2-tribromoethylamine, 1,1-bis(triiodomethyl)-2,2,2-triiodoethylamine, perfluoropropylamine, perchloropropylamine, perbromopropylamine, periodopropylamine, perfluorobutylamine, perchlorobutylamine, perbromobutylamine, periodobutylamine, perfluoropentylamine, perchloropentylamine, perbromopentylamine, periodopentylamine, perfluorohexylamine, perchlorohexylamine, perbromohexylamine, periodohexylamine, perfluorooctylamine, perchlorooctylamine, perbromooctylamine, periodooctylamine, perfluorododecylamine, perchlorododecylamine, perbromododecylamine, periodododecylamine, perfluoropentadecylamine, perchloropentadecylamine, perbromopentadecylamine, periodopentadecylamine, perfluoroeicosylamine, perchloroeicosylamine, perbromoeicosylamine and periodoeicosylamine.

Examples of anilines of the compound (c) are aniline 2,3,4-trimethylaniline, 2,3,5-trimethylaniline, 2,3,6-trimethylaniline, 2,4,6-trimethylaniline, 3,4,5-trimethylaniline, 2,3,4,5-tetramethylaniline, 2,3,4,6-tetramethylaniline, 2,3,5,6-tetramethylaniline, pentamethylaniline, ethylaniline, n-propylaniline, isopropylaniline, n-butylaniline, sec-butylaniline, tert-butylaniline, n-pentylaniline, neopentylaniline, n-hexylaniline, n-octylaniline, n-decylaniline, n-dodecylaniline, n-tetradecylaniline, 2-fluoroaniline, 3-fluoroaniline, 4-fluoroaniline, 2-chloroaniline, 3-chloroaniline, 4-chloroaniline, 2-bromoaniline, 3-bromoaniline, 4-bromoaniline, 2-iodoaniline, 3-iodoaniline, 4-iodoaniline, 2,6-difluoroaniline, 3,5-difluoroaniline, 2,6-dichloroaniline, 3,5-dichloroaniline, 2,6-dibromoaniline, 3,5-dibromoaniline, 2,6-diiodoaniline, 3,5-diiodoaniline, 2,4,6-trifluoroaniline, 2,4,6-trichloroaniline, 2,4,6-tribromoaniline, 2,4,6-triiodoaniline, 3,4,5-trifluoroaniline, 3,4,5-trichloroaniline, 3,4,5-tribromoaniline, 3,4,5-triiodoaniline, pentafluoroaniline, pentachloroaniline, pentabromoaniline, pentaiodoaniline, 2-(trifluoromethyl)aniline, 3-(trifluoromethyl)aniline, 4-(trifluoromethyl)aniline, 2,6-di(trifluoromethyl)aniline, 3,5-di(trifluoromethyl)aniline and 2,4,6-tri(trifluoromethyl)aniline.

The compound (c) is preferably water, hydrogen sulfide, methylamine, ethylamine, n-propylamine, isopropylamine, n-butylamine, sec-butylamine, tert-butylamine, isobutylamine, n-octylamine, aniline, 2,6-xylylamine, 2,4,6-trimethylaniline, naphthylamine, anthracenylamine, benzylamine, trifluoromethylamine, pentafluoroethylamine, perfluoroproylamine, perfluorobutylamine, perfluoropentylamine, perfluorohexylamine, perfluorooctylamine, perfluorododecylamine, perfluoropentadecylamine, perfluoroeicosylamine, 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-bis(trifluoromethyl)aniline, 3,5-bis(trifluoromethyl)aniline or 2,4,6-tris(trifluoromethyl)aniline; particularly preferably water, trifluoromethylamine, perfluorobutylamine, perfluorooctylamine, perfluoropentadecylamine, 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-bis(trifluoromethyl)aniline, 3,5-bis(trifluoromethyl)aniline or 2,4,6-tris(trifluoromethyl)aniline; and most preferably water or pentafluoroaniline.

The particle (d) is preferably a material generally used as a carrier, and preferably a porous material having a uniform particle diameter. An inorganic material or an organic polymer is preferable as the particle (d), and an inorganic material is more preferable.

From a viewpoint of a particle size distribution of an addition polymer produced, the particle (d) has a geometric standard deviation of preferably 2.5 or less, more preferably 2.0 or less, and further preferably 1.7 or less, wherein the geometric standard deviation is based on a volume of a particle diameter of the particle (d).

Examples of the above-mentioned inorganic material are inorganic oxides. Clay or clay mineral can also be used as the particle (d). The above-mentioned inorganic materials may be used in combination of two or more thereof.

Examples of the above-mentioned inorganic oxides are $SiO_2$, $Al_2O_3$, MgO, $ZrO_2$, $TiO_2$, $B_2O_3$, CaO, ZnO, BaO and $ThO_2$, and a combination of two or more thereof such as $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Among them, preferred is $SiO_2$, $Al_2O_3$ or $SiO_2$—$Al_2O_3$, and particularly preferred is $SiO_2$ (silica). The above-mentioned inorganic oxides may contain a small amount of carbonates, sulfates, nitrates or oxide components such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

Examples of the above-mentioned clay or clay mineral are kaolin, bentonite, knot clay, gaerome clay, allophane, hisingerite, pyrophylite, talc, a mica group, a montmorillnite group, vermiculite, a chlorite group, palygorskite, kaolinite, nacrite, dickite and halloycite.

Among them, preferred is smectite, montmorillnite, hectorite, raponite or saponite, and further preferred is montmorillnite or hectorite.

Among these inorganic materials, inorganic oxides are suitably used.

The above-mentioned inorganic materials are preferably dried to contain substantially no water, and said drying is preferably carried out by heat-treatment. Inorganic materials, whose water content cannot be visually confirmed, are usually heat-treated at from 100 to 1,500° C., preferably from 100 to 1,000° C., and further preferably from 200 to 800° C. The heating time is not particularly limited, and preferably from 10 minutes to 50 hours, more preferably from 1 hour to 30 hours. There can further be exemplified (1) a method of flowing a dry and inert gas such as nitrogen and argon at a constant flow rate, and (2) a method of evacuating, during the above-mentioned heating.

An average particle diameter of the inorganic material is preferably from 5 to 1,000 μm, more preferably from 10 to 500 μm, and further preferably from 10 to 100 μm. A pore volume thereof is preferably 0.1 ml/g or more, and more preferably from 0.3 to 10 ml/g. The specific surface area thereof is preferably from 10 to 1,000 $m^2/g$, and more preferably from 100 to 500 $m^2/g$.

The above-mentioned organic polymer as the particle (d) is not limited in its kind, and a combination of two or more of organic polymers may be used. The organic polymer is preferably a polymer containing (1) an active hydrogen-carrying functional group, or (2) a non-proton-donating Lewis basic functional group. The term "non-proton-donating Lewis basic functional group" means a Lewis basic functional group, which does not donate a proton.

The above-mentioned active hydrogen-carrying functional group is not particularly limited as far as it has an active hydrogen. Examples thereof are a primary amino group, a secondary amino group, an imino group, an amide group, an imide group, a hydrazide group, an amidino group, a hydroxyl group, a hydroperoxy group, a carboxyl group, a formyl group, a carbamoyl group, a sulfonic acid group, a sulfinic acid group, a sulfenic acid group, a thiol group, a thioformyl group, a pyrrolyl group, an imidazolyl group, a piperidyl group, an indazolyl group and a carbazolyl group. Among them, preferred is a primary amino group, a secondary amino group, an imino group, an amide group, an imide group, a hydroxy group, a formyl group, a carboxyl group, a sulfonic acid group or a thiol group. Particularly preferred is a primary amino group, a secondary amino group, an amide group or a hydroxyl group. One or more hydrogen atoms contained in these groups may be substituted with a halogen atom or a hydrocarbon group having 1 to 20 carbon atoms.

The above-mentioned non-proton-donating Lewis basic functional group is not particularly limited as far as it is a functional group having a Lewis base portion containing no active hydrogen atom. Examples thereof are a pyridyl group, an N-substituted imidazolyl group, an N-substituted indazolyl group, a nitrile group, an azido group, an N-substituted imino group, an N, N-substituted amino group, an N, N-substituted aminoxy group, an N, N, N-substituted hydrazino group, a nitroso group, a nitro group, a nitroxy group, a furyl group, a carbonyl group, a thiocarbonyl group, an alkoxy group, an alkyloxycarbonyl group, an N,N-substituted carbamoyl group, a thioalkoxy group, a substituted sulfinyl group, a substituted sulfonyl group and a substituted sulfonic acid group. Preferred is a heterocyclic group, and more preferred is an aromatic heterocyclic group having an oxygen atom and/or a nitrogen atom in its ring. Particularly preferred is a pyridyl group, an N-substituted imidazolyl group or an N-substituted indazoyl group, and most preferred is a pyridyl group. One or more hydrogen atoms contained in these groups may be substituted with a halogen atom or a hydrocarbon group having 1 to 20 carbon atoms.

An amount of the active hydrogen-carrying functional group or the non-proton-donating Lewis basic functional group contained in the organic polymer is not particularly limited, and said amount is preferably from 0.01 to 50 mmol/g, and more preferably from 0.1 to 20 mmol/g, wherein said amount means a molar amount of the functional group per g of the organic polymer.

The above-mentioned organic polymer containing (1) an active hydrogen-carrying functional group, or (2) a non-proton-donating Lewis basic functional group can be produced, for example, (i) by homopolymerizing a monomer having said functional group and at least one polymerizable unsaturated group, or (ii) by copolymerizing said monomer and at least one other monomer having a polymerizable unsaturated group, wherein a crosslinking polymerizable comonomer having two or more polymerizable unsaturated groups is also preferably copolymerized.

Examples of the above-mentioned polymerizable unsaturated group are an alkenyl group such as a vinyl group and an allyl group, and an alkynyl group such as an ethyne group.

Examples of the above-mentioned monomer having an active hydrogen-carrying functional group and at least one polymerizable unsaturated group are a vinyl group-containing primary amine, a vinyl group-containing secondary amine, a vinyl group-containing amide compound and a vinyl group-containing hydroxyl compound. Specific examples thereof are N-(1-ethenyl)amine, N-(2-propenyl)amine, N-(1-ethenyl)-N-methylamine, N-(2-propenyl)-N-methylamine, 1-ethenylamide, 2-propenylamide, N-methyl-(1-ethenyl)amide, N-methyl-(2-propenyl)amide, vinyl alcohol, 2-propen-1-ol and 3-buten-1-ol.

Specific examples of a monomer having a non-proton-donating Lewis basic functional group and at least one polymerizable unsaturated group are vinylpyridine, vinyl(N-substituted)imidazole and vinyl(N-substituted)indazole.

Examples of the above-mentioned other monomer having a polymerizable unsaturated group are ethylene, an α-olefin and an aromatic vinyl compound. Specific examples of the α-olefin and the aromatic vinyl compound are propylene, 1-butene, 1-hexene, 4-methyl-1-pentene and styrene. Preferred is ethylene or styrene. The above-mentioned monomers may be used in a combination of two or more thereof.

An example of the above-mentioned crosslinking polymerizable comonomer having two or more polymerizable unsaturated groups is divinylbenzene.

An average particle diameter of the above-mentioned organic polymer is preferably from 5 to 1,000 μm, and more preferably from 10 to 500 μm. A pore volume thereof is preferably 0.1 ml/g or more, and more preferably from 0.3 to 10 ml/g. A specific surface area thereof is preferably from 10 to 1,000 m$^2$/g, and more preferably from 50 to 500 m$^2$/g.

The above-mentioned organic polymer is preferably dried to contain substantially no water, and said drying is preferably carried out by heat-treatment. The organic polymer, whose water content cannot be visually confirmed, is usually heat-treated at from 30 to 400° C., preferably from 50 to 200° C., and further preferably from 70 to 150° C. The heating time is not particularly limited, and preferably from 10 minutes to 50 hours, and more preferably from 1 hour to 30 hours. There can further be exemplified (1) a method of flowing a dry and inert gas such as nitrogen and argon at a constant flow rate, and (2) a method of evacuating, during the above-mentioned heating.

The contacting steps (1) and (2) in the process-1 in accordance with the present invention are preferably carried out under an inert gas atmosphere. Their contacting temperature is usually from −100 to 300° C., and preferably from −80 to 200° C. Their contacting time is usually from 1 minute to 200 hours, and preferably from 10 minutes to 100 hours. Said contacting is carried out with or without a solvent.

The above-mentioned solvent is generally inert to the compounds (a), (b) and (c), the particle (d), the contact product of the compound (a) with the compound (b), and the contact product of the above-mentioned contact product with the compound (c). However, when a solvent reactive (not inert) to the compound (a) and/or the compound (b) is inert to the contact product of the compound (a) with the compound (b), said solvent may be used in the contacting step (2) of the process-1; namely, a solvent used in the contacting step (1) of the process-1 may be different from a solvent used in the contacting step (2) thereof.

Examples of the above-mentioned solvent are a non-polar solvent such as an aliphatic hydrocarbon solvent and an aromatic hydrocarbon solvent, and a polar solvent such as a halide solvent, an ether solvent, a carbonyl solvent, a phosphoric acid derivative, a nitrile solvent, a nitro compound, an amine solvent and a sulfur compound. Specific examples thereof are an aliphatic hydrocarbon solvent such as butane, pentane, hexane, heptane, octane, decane, 2,2,4-trimethylpentane and cyclohexane; an aromatic hydrocarbon solvent such as benzene, toluene and xylene; a halide solvent such as dichloromethane, difluoromethane, chloroform, 1,2-dichloroethane, 1,2-dibromoethane, 1,1,2-trichloro-1,2,2-trifluoroethane, tetrachloroethylene, chlorobenzene, bromobenzene and o-dichlorobenzene; an ether solvent such as dimethyl ether, diethyl ether, diisopropyl ether, di-n-butyl ether, methyl-tert-butyl ether, anisole, 1,4-dioxane, 1,2-dimethoxyethane, bis(2-methoxyethyl)ether, tetrahydrofuran and tetrahydropyran; a carbonyl solvent such as acetone, ethyl methyl ketone, cyclohexanone, acetic anhydride, ethyl acetate, butyl acetate, ethylene carbonate, propylene carbonate, N,N-dimethylformamide, N,N-dimethylacetamide and N-methyl-2-pyrrolidone; a phosphoric acid derivative such as hexamethylphosphate triamide and triethyl phosphate; a nitrile solvent such as acetonitrile, propionitrile, succinonitrile and benzonitrile; a nitro compound such as nitromethane and nitrobenzene; an amine solvent such as pyridine, piperidine and morpholine; and a sulfur compound such as dimethylsulfoxide and sulfolane.

Among the above-mentioned non-polar and polar solvents, the non-polar solvent is preferable. The possible reason for this is that the contact product between (i) the contact product of the compound (a) with the compound (b) and (ii) the compound (c) usually has a low solubility in a non-polar solvent, and therefore, when the particle (d) and the above-mentioned contact product between the above (i) and (ii) exist in a reaction system at the same time, the contact product between (i) and (ii) is more stable in its precipitation on the surface of the particle (d) than in its existence in the non-polar solvent, and as a result, the contact product between (i) and (ii) is easily fixed on the surface of the particle (d).

Respective amounts of the above-mentioned compounds (a), (b) and (c) used (namely, respective amounts thereof participated in the reaction) are not particularly limited. Said amounts preferably satisfy substantially the following formula (1), $$3-y-2z \leq 0 \qquad (1)$$

wherein y and z mean molar amounts of the compounds (b) and (c) used per one mol of the compound (a) used, respectively.

In the formula (1), y is preferably from 0.01 to 2.99, more preferably from 0.1 to 2.8, further preferably from 0.2 to 2.5, and most preferably from 0.25 to 1.75. A preferable range of z therein is determined by y and the formula (1).

The particle (d) is used in such an amount that 1 g of the product produced in the step (2) of the process-1 contains an atom of the Group 13 derived from the compound (a) in an amount of preferably 0.1 mmol or more, and more preferably from 0.5 to 20 mmol.

Preferable examples of a method for promoting the reaction in the process-1 are (i) a method of further heating the reaction mixture produced in the step (2) of the process-1, and (ii) a method of removing a by-product produced in the step (1), the step (2) and the additional heating step of the above-mentioned method (i). A preferable specific example of a method for carrying out the further heating in the above-mentioned method (i) at a higher temperature is a method of replacing a solvent used for contacting with a solvent having a higher boiling point. Specific examples of the above-mentioned method (ii) are (a) a method of removing a gaseous by-product from a gas-removing apparatus installed in a reaction system, and (b) a method of heating a liquid by-product to a temperature higher than its boiling point to vaporize it, and then removing the resultant gaseous by-product from the above-mentioned gas-removing apparatus.

The product produced by the process-1 may contain the compound (a), (b) or (c), or the particle (d) remaining unreacted. However, when said product is applied to an addition polymerized particle-producing polymerization, it is preferable to add the step of washing said product with a solvent in order to remove said unreacted materials contained therein in advance. Said solvent may be the same as, or different from that used in the steps (1) and (2) mentioned above. The above-mentioned washing step is carried out preferably under an inert gas atmosphere generally at from −100 to 300° C., and preferably from −80 to 200° C., for from 1 minute to 200 hours, and preferably from 10 minutes to 100 hours.

After the step (2), or after the above-mentioned washing step, it is preferable to carry out the further step of removing the solvent contained in the product by distillation, and carry out the still further step of drying the product under a reduced pressure preferably at 0° C. or higher for from 0.5 to 24 hours, more preferably at from 0 to 250° C. for from 0.5 to 24 hours, further preferably at from 10 to 200° C. for from 1 to 24 hours, particularly preferably at from 10 to 160° C. for from 1 to 18 hours, and most preferably at from 15 to 130° C. for from 1 to 18 hours.

A specific example of the process-1 is explained below in more detail, wherein $M^1$ is an aluminum atom, the compound (b) is 1,1,1,3,3,3-hexafluoro-2-(trifluoromethyl)-2-propanol, the compound (c) is water, and the particle (d) is silica. The product in the process-1 is produced by the steps of:

(i) adding triethylaluminum to a solvent (toluene), thereby obtaining a mixture, (ii) cooling the mixture to 3° C., (iii) adding dropwise 1,1,1,3,3,3-hexafluoro-2-(trifluoromethyl)-2-propanol to the mixture, (iv) stirring the mixture at a room temperature for from 10 minutes to 24 hours, (v) adding silica to the mixture, (vi) adding dropwise water to the mixture, (vii) stirring the mixture at a room temperature for from 10 minutes to 24 hours, thereby obtaining a product, (viii) washing the product by replacing several times the solvent with a new solvent as mentioned above, and (ix) drying the washed product under a reduced pressure at 60° C. for 2 hours.

The product produced by the proess-1 is a modified particle, which can be used as (1) a catalyst component for addition polymerization (particularly for olefin polymerization), or (2) a carrier supporting a catalyst component for addition polymerization, which component comprises a transition metal compound forming a single site catalyst. The catalysts produced by the above-mentioned processes-2 and 3 in accordance with the present invention are explained below. Regarding the processes-2 and 3, the catalyst produced using the above-mentioned modified particle (A), the transition metal compound (B) and the organoaluminum compound (C) has a higher polymerization activity than the catalyst produced using the modified particle (A) and the transition metal compound (B).

(B) Transition Metal Compound

The transition metal compound (B) used in the present invention means a transition metal compound capable of forming a single site catalyst. Said transition metal compound is not particularly limited as far as it exhibits an addition polymerization activity in its combined use with the modified particle (A) and optionally the organoaluminum compound (C). The term "single site catalyst" is conceptually distinguished from the conventional solid catalyst. Said term means not only a narrow sense single site catalyst giving an addition polymer of (i) a narrow molecular weight distribution, or (ii) a narrow composition distribution in case of a copolymer, but also a catalyst giving an addition polymer of (i) a broad molecular weight distribution, or (ii) a broad composition distribution in case of a copolymer, as far as the catalyst is produced by a process similar to a process for producing the narrow sense single site catalyst.

The transition metal compound (B) is preferably a transition metal compound of a transition metal of Groups 3 to 11 or the lanthanide series, and more preferably a transition metal compound represented by the following formula [4], or its μ-oxo type transition metal compound dimer,

  [4]

wherein $M^2$ is a transition metal atom of Groups 3 to 11 or the lanthanide series; $L^2$ is a cyclopentadienyl type anion skeleton-carrying group or a hetero atom-containing group; when two or more $L^2$s exist, they are the same as or different from one another, and may be connected directly with one another or through a residual group containing a carbon atom, a silicone atom, a nitrogen atom, an oxygen atom, a sulfur atom or a phosphorus atom; $X^1$ is a halogen atom, a hydrocarbon group (excluding the above-mentioned cyclopentadienyl type anion skeleton-carrying group) or a hydrocarbyloxy group; a is a number satisfying $0<a\leqq8$; and b is a number satisfying $0<b\leqq8$.

Examples of $M^2$ in the formula [4] are a scandium atom, an yttrium atom, a titanium atom, a zirconium atom, a hafnium atom, a vanadium atom, a niobium atom, a tantalum atom, a chromium atom, an iron atom, a ruthenium atom, a cobalt atom, a rhodium atom, a nickel atom, a palladium atom, a samarium atom and an ytterbium atom. $M^2$ is preferably a titanium atom, a zirconium atom, a hafnium atom, a vanadium atom, a chromium atom, an iron atom, a cobalt atom or a nickel atom; particularly preferably a titanium atom, a zirconium atom or a hafnium atom; and most preferably a zirconium atom.

Examples of the cyclopentadienyl type anion skeleton-carrying group of $L^2$ in the formula [4] are $\eta^5$ (substituted) cyclopentadienyl groups, $\eta^5$ (substituted)indenyl groups and $\eta^5$-(substituted)fluorenyl groups. Specific examples thereof are an $\eta^5$-cyclopentadienyl group, an $\eta^5$-methylcyclopentadienyl group, an $\eta^5$-ethylcyclopentadienyl group, an $\eta^5$-n-butylcyclopentadienyl group, an $\eta^5$-tert-butylcyclopentadienyl group, an $\eta^5$-1,2-dimethylcyclopentadienyl group, an $\eta^5$-1,3-dimethylcyclopentadienyl group, an $\eta^5$-1-methyl-2-ethylcyclopentadienyl group, an $\eta^5$-1-methyl-3-ethylcyclopentadienyl group, an η5-1-tert-butyl-2-methylcyclopentadienyl group, an $\eta^5$-1-tert-butyl-3-methylcyclopentadienyl group, an $\eta^5$-1-methyl-2-isopropylcyclopentadienyl group, an $\eta^5$-1-methyl-3-isopropylcyclopentadienyl group, an $\eta^5$-1-methyl-2-n-butylcyclopentadienyl group, an $\eta^5$-1-methyl-3-n-butylcyclopentadienyl group, an $\eta^5$-1,2,3-trimethylcyclopentadienyl group, an $\eta^5$-1,2,4-trimethylcyclopentadienyl group, an $\eta^5$-tetramethylcyclopentadienyl group, an $\eta^5$-pentamethylcyclopentadienyl group, an $\eta^5$-indenyl group, an $\eta^5$-4,5,6,7-tetrahydroindenyl group, an $\eta^5$-2-methylindenyl group, an $\eta^5$-3-methylindenyl group, an $\eta^5$-4-methylindenyl group, an $\eta^5$-5-methylindenyl group, an $\eta^5$-6-methylindenyl group, an $\eta^5$-7-methylindenyl group, an $\eta^5$-2-tert-butylindenyl group, an $\eta^5$-3-tert-butylindenyl group, an $\eta^5$-4-tert-butylindenyl group, an $\eta^5$-5-tert-butylindenyl group, an $\eta^5$-6-tert-butylindenyl group, an $\eta^5$-7-tert-butylindenyl group, an $\eta^5$-2,3-dimethylindenyl group, an $\eta^5$-4,7-dimethylindenyl group, an $\eta^5$-2,4,7-trimethylindenyl group, an $\eta^5$-2-methyl-4-isopropylindenyl group, an $\eta^5$-4,5-benzindenyl group, an $\eta^5$-2-methyl-4,5-benzindenyl group, an $\eta^5$-4-phenylindenyl group, an $\eta^5$-2-methyl-5-phenylindenyl group, an $\eta^5$-2-methyl-4-phenylindenyl group, an $\eta^5$-2-methyl-4-naphthylindenyl group, an $\eta^5$-fluorenyl group, an $\eta^5$-2,7-dimethylfluorenyl group and an $\eta^5$-2,7-di-tert-butylfluorenyl group; and their substitution compounds.

In the present specification, the term "$\eta^5$-" contained in the above-mentioned names of the transition metal compound may be omitted in some cases.

Examples of the hetero atom contained in the above-mentioned hetero atom-containing group of $L^2$ in the formula [4] are an oxygen atom, a sulfur atom, a nitrogen atom and a phosphorus atom. The hetero atom-containing group is preferably an alkoxy group; an aryloxy group; a thioalkoxy group; a thioaryloxy group; an alkylamino group; an arylamino group; an alkylphosphino group; an arylphosphino group; a chelating ligand; an aromatic group containing an oxygen atom, a sulfur atom, a nitrogen atom or a phosphorus atom in its ring; or an aliphatic heterocyclic group containing the same in its ring.

Specific examples of the hetero atom-containing group of $L^2$ are a methoxy group, an ethoxy group, a propoxy group, a butoxy group, a phenoxy group, a 2-methylphenoxy group, a 2,6-dimethylphenoxy group, a 2,4,6-trimethylphenoxy group, a 2-ethylphenoxy group, a 4-n-propylphenoxy group, a 2-isopropylphenoxy group, a 2,6-diisopropylphenoxy group, a 4-sec-butylphenoxy group, a 4-tert-butylphenoxy group, a 2,6-di-sec-butylphenoxy group, a 2-tert-butyl-4-methylphenoxy group, a 2,6-di-tert-butylphenoxy group, a 4-methoxyphenoxy group, a 2,6-dimethoxyphenoxy group, a 3,5-dimethoxyphenoxy group, a 2-chlorophenoxy group, a 4-nitrosophenoxy group, a 4-nitrophenoxy group, a 2-aminophenoxy group, a 3-aminophenoxy group, a 4-aminothiophenoxy group, a 2,3,6-trichlorophenoxy group, a 2,4,6-trifluorophenoxy group, a thiomethoxy group, a dimethylamino group, a diethylamino group, a dipropylamino group, a diphenylamino group, an isopropylamino group, a tert-butylamino group, a pyrrolyl group, a dimethylphosphino group, a 2-(2-oxy-1-propyl)phenoxy group, catechol, resorcinol, 4-isopropylcatechol, 3-methoxycatechol, a 1,8-dihydroxynahpthyl group, a 1,2-dihydroxynahpthyl group, a 2,2'-biphenyldiol group, a 1,1'-bi-2-naphthol group, a 2,2'-dihydroxy-6,6'-dimethylbiphenyl group, a 4,4',6,6'-tetra-tert-butyl-2,2'-methylenediphenoxy group and a 4,4',6, 6'-tetramethyl-2,2'-isobutylidenediphenoxy group.

A further example of the above-mentioned hetero atom-containing group is a group represented by the following formula [5],

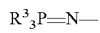

[5]

wherein three $R^3$s are independently of one another a hydrogen atom, a halogen atom or a hydrocarbon group; they are the same as or different from one another; two or three thereof may be connected with one another; and two or three thereof may form a ring.

Specific examples of $R^3$ in the formula [5] are a hydrogen atom, a fluorine atom, a chlorine atom, a bromine atom, an iodine atom, a methyl group, an ethyl group, a n-propyl group, an isopropyl group, a n-butyl group, a tert-butyl group, a cyclopropyl group, a cyclobutyl group, a cycloheptyl group, a cyclohexyl group, a phenyl group, a 1-naphthyl group, a 2-naphthyl group and a benzyl group.

A still further example of the above-mentioned hetero atom-containing group is a group represented by the following formula [6],

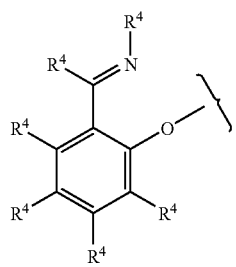

[6]

wherein all $R^4$s are independently of one another a hydrogen atom, a halogen atom, a hydrocarbon group, a halogenated hydrocarbon group, a hydrocarbyloxy group, a silyl group or an amino group; they are the same as or different from one another; two or three thereof may be connected with one another; and two or three thereof may form a ring.

Specific examples of $R^4$ in the formula [6] are a hydrogen atom, a fluorine atom, a chlorine atom, a bromine atom, an iodine atom, a phenyl group, a 1-naphthyl group, a 2-naphthyl group, a tert-butyl group, a 2,6-dimethylphenyl group, a 2-fluorenyl group, a 2-methylphenyl group, a 4-trifluoropmethylphenyl group, a 4-methoxyphenyl group, a 4-pyridyl group, a cyclohexyl group, a 2-isopropylphenyl group, a benzyl group, a methyl group, a triethylsilyl group, a diphenylmethylsilyl group, a 1-methyl-1-phenylethyl group, a 1,1-dimethylpropyl group, a 2-chlorophenyl group and a pentafluorophenyl group.

The above-mentioned chelating ligand of the hetero atom-containing group ($L^2$) means a ligand having two or more coordinating position. Specific examples thereof are acetylacetonate, diimine, oxazoline, bisoxazoline, terpyridine, acylhydrazone, diethylenetriamine, triethylenetetramine, porphyrin, crown ether and cryptate.

Specific examples of the above-mentioned aliphatic heterocyclic group of the hetero atom-containing group ($L^2$) are a pyridyl group, an N-substituted imidazolyl group and an N-substituted indazolyl group, and preferred is a pyridyl group.

The residual group in the formula [4] is preferably a residual group containing a carbon, silicone, nitrogen, oxygen, sulfur or phosphorus atom, through which residual group two $L^2$ groups are connected to each other (namely, a residual group when a is 2 in the formula [4]); and more preferably a residual group, which contains from 1 to 3 atoms existing on a line connecting said two $L^2$ groups (namely, when the residual group has a branched chain, atoms contained in the branched chain are not counted).

Specific examples of the residual group are an alkylene group such as a methylene group, an ethylene group and a propylene group; a substituted alkylene group such as a dimethylmethylene group and a diphenylmethylene group; a silylene group; a substituted silylene group such as a dimethylsilylene group, a diphenylsilylene group and a tetramethyldisilylene group; and a hetero atom such as a nitrogen atom, an oxygen atom, a sulfur atom and a phosphorus atom. Among them, particularly preferred is a methylene group, an ethylene group, a dimethylmethylene group (an isopropylidene group), a dimethylsilylene group, a diethylsilylene group or a diphenylsilylene group.

Specific examples of the halogen atom of $X^1$ in the formula [4] are a fluorine atom, a chlorine atom, a bromine atom and an iodine atom. Examples of the hydrocarbon group of $X^1$ in the formula [4] are an alkyl group, an aralkyl group, an aryl group and an alkenyl group, and preferred is an alkyl group having 1 to 20 carbon atoms, an aralkyl group having 7 to 20 carbon atoms, an aryl group having 6 to 20 carbon atoms or an alkenyl group having 3 to 20 carbon atoms.

Examples of the above-mentioned alkyl group having 1 to 20 carbon atoms of $X^1$ in the formula [4] are a methyl group, an ethyl group, a n-propyl group, an isopropyl group, a n-butyl group, a sec-butyl group, a tert-butyl group, an isobutyl group, a n-pentyl group, a neopentyl group, an amyl group, a n-hexyl group, a n-octyl group, a n-decyl group, a n-dodecyl group, a n-pentadecyl group and a n-eicosyl group. Among them, preferred is a methyl group, an ethyl group, an isopropyl group, a tert-butyl group, an isobutyl group or an amyl group.

One or more hydrogen atoms contained in the above-mentioned alkyl groups may be substituted with a halogen atom such as a fluorine atom, a chlorine atom, a bromine atom and an iodine atom. Examples of the alkyl group having 1 to 20 carbon atoms, which are substituted with a halogen atom, are a fluoromethyl group, a trifluoromethyl group, a chloromethyl group, a trichloromethyl group, a fluoroethyl group, a pentafluoroethyl group, a perfluoropropyl group, a perfluorobutyl group, a perfluorohexyl group, a perfluorooctyl group, a perchloropropyl group, a perchlorobutyl group and a perbromopropyl group.

Further, one or more hydrogen atoms contained in the above-mentioned alkyl groups may be substituted with an alkoxy group such as a methoxy group and an ethoxy group; an aryloxy group such as a phenoxy group; or an aralkyloxy group such as a benzyloxy group.

Examples of the above-mentioned aralkyl group having 7 to 20 carbon atoms of $X^1$ in the formula [4] are a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (3,5-dimethylphenyl)methyl group, a (2,3,4-timethylphenyl)methyl group, a (2,3,5-timethylphenyl)methyl group, a (2,3,6-timethylphenyl)methyl group, a (3,4,5-timethylphenyl)methyl group, a (2,4,6-timethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl)methyl group, a (sec-butylphenyl)methyl group, a (tert-butylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a (n-dodecylphenyl)methyl group, a naphthylmethyl group and an anthracenylmethyl group. Among them, preferred is a benzyl group.

One or more hydrogen atoms contained in the above-mentioned aralkyl groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

Examples of the above-mentioned aryl group having 6 to 20 carbon atoms of $X^1$ in the formula [4] are a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group and an anthracenyl group. Among them, preferred is a phenyl group.

One or more hydrogen atoms contained in the above-mentioned aryl groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

Examples of the above-mentioned alkenyl group having 3 to 20 carbon atoms of $X^1$ in the formula [4] are an allyl group, a methallyl group, a crotyl group and a 1,3-diphenyl-2-propenyl group. Among them, preferred is an allyl group or a methallyl group.

Examples of the hydrocarbyloxy group of $X^1$ in the formula [4] are an alkoxy group, an aralkyloxy group and an aryloxy group. Preferred is an alkoxy group having 1 to 20 carbon atoms, an aralkyloxy group having 7 to 20 carbon atoms or an aryloxy group having 6 to 20 carbon atoms.

Examples of the above-mentioned alkoxy group having 1 to 20 carbon atoms are a methoxy group, an ethoxy group, a n-propoxy group, an isopropoxy group, a n-butoxy group, a sec-butoxy group, a tert-butoxy group, a n-pentoxy group, a neopentoxy group, a n-hexoxy group, a n-octoxy group, a n-dodecoxy group, a n-pentadecoxy group and a n-eicosoxy group. Among them, preferred is a methoxy group, an ethoxy group, an isopropoxy group or a tert-butoxy group.

One or more hydrogen atoms contained in the above-mentioned alkoxy groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

Examples of the above-mentioned aralkyloxy group having 7 to 20 carbon atoms of $X^1$ in the formula [4] are a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a naphthyl methoxy group and an anthracenyl methoxy group. Among them, preferred is a benzyloxy group.

One or more hydrogen atoms contained in the above-mentioned aralkyloxy groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

Examples of the above-mentioned aryloxy group having 6 to 20 carbon atoms of $X^1$ in the formula [4] are a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 2-tert-butyl-3,4-dimethylphenoxy group, a 2-tert-butyl-3,5-dimethylphenoxy group, a 2-tert-butyl-3,6-dimethylphenoxy group, a 2,6-di-tert-butyl-3-methylphenoxy group, a 2-tert-butyl-4,5-dimethylphenoxy group, a 2,6-di-tert-butyl-4-methylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group and an anthracenoxy group.

One or more hydrogen atoms contained in the above-mentioned aryloxy groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

$X^1$ in the above-mentioned formula [4] is more preferably a chlorine atom, a methyl group, an ethyl group, a n-propyl group, an isopropyl group, a n-butyl group, a methoxy group, an ethoxy group, a n-propoxy group, an isopropoxy group, a n-butoxy group, a trifluoromethoxy group, a phenyl group, a phenoxy group, a 2,6-di-tert-butylphenoxy group, a 3,4,5-trifluorophenoxy group, a pentafluorophenoxy group, a 2,3,5,6-tetrafluoro-4-pentafluorophenoxy group or a benzyl group.

In the above-mentioned formula [4], each number of "a" and "b" is suitably selected depending upon a valence of $M^2$. When $M^2$ is a titanium atom, a zirconium atom or a hafnium atom, each of "a" and "b" is preferably 2.

Specific examples of the transition metal compound represented by the above-mentioned formula [4], wherein the transition metal atom is a titanium atom, a zirconium atom or a hafnium atom, are bis(cyclopentadienyl)titanium dichloride, bis(methylcyclopentadienyl)titanium dichloride, bis(ethylcyclopentadienyl)titanium dichloride, bis(n-butylcyclopentadienyl)titanium dichloride, bis(tert-butylcyclopentadienyl)titanium dichloride, bis(1,2-dimethylcyclopentadienyl)titanium dichloride, bis(1,3-dimethylcyclopentadienyl)titanium dichloride, bis(1-methyl-2-ethylcyclopentadienyl)titanium dichloride, bis(1-methyl-3-ethylcyclopentadienyl)titanium dichloride, bis(1-methyl-2-n-butylcyclopentadienyl)titanium dichloride, bis(1-methyl-3-n-butylcyclopentadienyl)titanium dichloride, bis(1-methyl-2-isopropylcyclopentadienyl)titanium dichloride, bis(1-methyl-3-isopropylcyclopentadienyl)titanium dichloride, bis(1-tert-butyl-2-methylcyclopentadienyl)titanium dichloride, bis(1-tert-butyl-3-methylcyclopentadienyl)titanium dichloride, bis(1,2,3-trimethylcyclopentadienyl)titanium dichloride, bis(1,2,4-trimethylcyclopentadienyl)titanium dichloride, bis(tetramethylcyclopentadienyl)titanium dichloride, bis(pentamethylcyclopentadienyl)titanium dichloride, bis(indenyl)titanium dichloride, bis(4,5,6,7-tetrahydroindenyl)titanium dichloride, bis(fluorenyl)titanium dichloride, bis(2-phenyindenyl) titanium dichloride, bis[2-(bis-3,5-trifluoromethylphenyl)indenyl]titanium dichloride, bis[2-(4-tert-butylphenyl)indenyl]titanium dichloride, bis[2-(4-trifluoromethylphenyl)indenyl]titanium dichloride, bis[2-(4-methyphenyl)indenyl]titanium dichloride, bis[2-(3,5-dimethylphenyl)indenyl]titanium dichloride, bis[2-(pentafluorophenyl)indenyl]titanium dichloride, cyclopentadienyl(pentamethylcyclopentadienyl) titanium dichloride, cyclopentadienyl(indenyl)titanium dichloride, cyclopentadienyl(fluorenyl)titanium dichloride, indenyl(fluorenyl)titanium dichloride, pentamethylcyclopentadienyl(indenyl)titanium dichloride, pentamethylcyclopentadienyl(fluorenyl)titanium dichloride, cyclopentadienyl(2-phenylindenyl)titanium dichloride, pentamethylcyclopentadienyl(2-phenylindenyl)titanium dichloride, dimethylsilylenebis(cyclopentadienyl)titanium dichloride, dimethylsilylenebis(2-methylcyclopentadienyl) titanium dichloride, dimethylsilylenebis (3-methylcyclopentadienyl) titanium dichloride, dimethylsilylenebis(2-n-butylcyclopentadienyl)titanium dichloride, dimethylsilylenebis (3-n-butylcyclopentadienyl) titanium dichloride, dimethylsilylenebis (2,3-dimethylcyclopentadienyl)titanium dichloride, dimethylsilylenebis(2,4-dimethylcyclopentadienyl) titanium dichloride, dimethylsilylenebis(2,5-dimethylcyclopentadienyl) titanium dichloride, dimethylsilylenebis (3,4-dimethylcyclopentadienyl) titanium dichloride, dimethylsilylenebis(2,3-ethylmethylcyclopentadienyl)titanium dichloride, dimethylsilylenebis(2,4-ethylmethylcyclopentadienyl)titanium dichloride, dimethylsilylenebis(2,5-ethylmethylcyclopentadienyl) titanium dichloride, dimethylsilylenebis (3,5-ethylmethylcyclopentadienyl)titanium dichloride, dimethylsilylenebis(2,3,4-trimethylcyclopentadienyl)titanium dichloride, dimethylsilylenebis(2,3,5-trimethylcyclopentadienyl)titanium dichloride, dimethylsilylenebis(tetramethylcyclopentadienyl)titanium dichloride, dimethylsilylenebis(indenyl) titanium dichloride, dimethylsilylenebis(2-methylindenyl)titanium dichloride, dimethylsilylenebis(2-tert-butylindenyl)titanium dichloride, dimethylsilylenebis(2,3-dimethylindenyl)titanium dichloride, dimethylsilylenebis(2,4,7-trimethylindenyl) titanium dichloride, dimethylsilylenebis(2-methyl-4-isopropylindenyl)titanium dichloride, dimethylsilylenebis(4,5-benzindenyl)titanium dichloride, dimethylsilylenebis(2-methyl-4,5-benzindenyl) titanium dichloride, dimethylsilylenebis(2-phenylindenyl)titanium dichloride, dimethylsilylenebis(4-phenylindenyl)titanium dichloride, dimethylsilylenebis(2-methyl-4-phenylindenyl)titanium dichloride, dimethylsilylenebis(2-methyl-5-phenylindenyl) titanium dichloride, dimethylsilylenebis(2-methyl-4-naphthylindenyl)titanium dichloride, dimethylsilylenebis(4,5,6,7-tetrahydroindenyl) titanium dichloride, dimethylsilylene(cyclopentadienyl) (indenyl)titanium dichloride, dimethylsilylene (methylcyclopentadienyl)(indenyl)titanium dichloride, dimethylsilylene(n-butylcyclopentadienyl) (indenyl)titanium dichloride, dimethylsilylene(tetramethylcyclopentadienyl) (indenyl)titanium dichloride, dimethylsilylene (cyclopentadienyl)(fluorenyl)titanium dichloride, dimethylsilylene (methylcyclopentadienyl)(fluorenyl)titanium dichloride, dimethylsilylene(n-butylcyclopentadienyl) (fluorenyl)titanium dichloride, dimethylsilylene(tetramethylcyclopentadienyl) (indenyl)titanium dichloride, dimethylsilylene(indenyl)(fluorenyl)titanium dichloride, dimethylsilylenebis (fluorenyl)titanium dichloride, dimethylsilylene (cyclopentadienyl) (tetramethylcyclopentadienyl)titanium dichloride, dimethylsilylene(tetramethylcyclopentadienyl) (fluorenyl)titanium dichloride, cyclopentadienyltitanium trichloride, pentamethylcyclopentadienyltitanium trichloride, cyclopentadienyl(dimethylamido)titanium dichloride, cyclopentadienyl(phenoxy)titanium dichloride, cyclopentadienyl(2,6-dimethylphenyl)titanium dichloride, cyclopentadienyl(2,6-diisopropylphenyl)titanium dichloride, cyclopentadienyl(2,6-di-tert-butylphenyl)titanium dichloride, pentamethylcyclopentadienyl(2,6-dimethylphenyl)titanium dichloride, pentamethylcyclopentadienyl(2,6-diisopropylphenyl) titanium dichloride, pentamethylcyclopentadienyl (2,6-tert-butylphenyl)titanium dichloride, indenyl(2,6-diisopropylphenyl)titanium dichloride, fluorenyl(2,6-diisopropylphenyl)titanium dichloride, (tert-butylamido)

tetramethylcyclopentadienyl-1,2-ethanediyl-titanium dichloride, (methylamido)tetramethylcyclopentadienyl-1,2-ethanediyl-titanium dichloride, (ethylamido)tetramethylcyclopentadienyl-1,2-ethanediyl-titanium dichloride, (tert-butylamido)tetramethylcyclopentadienyldimethylsilane titanium dichloride, (benzylamido)tetramethylcyclopentadienyldimethylsilane titanium dichloride, (phenylphosphido)tetramethylcyclopentadienyldimethylsilane titanium dichloride, (tert-butylamido)indenyl-1,2-ethanediyl titanium dichloride, (tert-butylamido)tetrahydroindenyl-1,2-ethanediyl titanium dichloride, (tert-butylamido)fluorenyl-1,2-ethanediyl titanium dichloride, (tert-butylamido)indenyldimethylsilane titanium dichloride, (tert-butylamido)tetrahydroindenyldimethylsilane titanium dichloride, (tert-butylamido)fluorenyldimethylsilane titanium dichloride, (dimethylaminomethyl)tetramethylcyclopentadienyl titanium(III) dichloride, (dimethylaminoethyl)tetramethylcyclopentadienyl titanium(III) dichloride, (dimethylaminopropyl)tetramethylcyclopentadienyl titanium(III) dichloride, (N-pyrrolidinylethyl)tetramethylcyclopentadienyl titanium dichloride, (B-dimethylaminoborabenzene)cyclopentadienyl titanium dichloride, cyclopentadienyl(9-mesitylboraanthracenyl)titanium dichloride,2,2'-thiobis[4-methyl-6-tert-butylphenoxy]titanium dichloride, 2,2'-thiobis[4-methyl-6-(1-methylethyl) phenoxy]titanium dichloride, 2,2'-thiobis[4,6-dimethylphenoxy]titanium dichloride, 2,2'-thiobis(4-methyl-6-tert-butylphenoxy)titanium dichloride, 2,2'-methylenebis(4-methyl-6-tert-butylphenoxy)titanium dichloride, 2,2'-ethylenebis(4-methyl-6-tert-butylphenoxy) titanium dichloride, 2,2'-sulfinylbis(4-methyl-6-tert-butylphenoxy)titanium dichloride, 2,2'-(4,4',6,6'-tetra-tert-butyl-1,1'-biphenoxy) titanium dichloride, (di-tert-butyl-1,3-propanediamido)titanium dichloride, (dicyclohexyl-1,3-propanediamido)titanium dichloride, [bis(trimethylsilyl)-1,3-propanediamido]titanium dichloride, [bis(tert-butyldimethylsilyl)-1,3-propanediamido]titanium dichloride, [bis(2,6-dimethylphenyl)-1,3-propanediamido] titanium dichloride, [bis(2,6-diisopropylphenyl)-1,3-propanediamido]titanium dichloride, [bis(2,6-di-tert-butylphenyl)-1,3-propanediamido]titanium dichloride, [bis(triisopropylsilyl)naphthalenediamido]titanium dichloride, [bis(trimethylsilyl)naphthalenediamido]titanium dichloride, [bis(tert-butyldimethylsilyl)naphthalenediamido]titanium dichloride, [hydrotris(3,5-dimethylpyrazolyl)borate]titanium trichloride, [hydrotris(3,5-diethylpyrazolyl)borate]titanium trichloride, [hydrotris(3,5-di-tert-butylpyrazolyl) borate]titanium trichloride, [tris(3,5-dimethylpyrazolyl)methyl]titanium trichloride, [tris(3,5-diethylpyrazolyl)methyl] titanium trichloride and [tris(3,5-di-tert-butylpyrazolyl)methyl]titanium trichloride; compounds formed by changing the term "titanium" contained in each of the above-mentioned compounds to the term "zirconium" or "hafnium"; compounds formed by changing the term "dimethylsilylene" contained therein to the term "methylene", "ethylene", "dimethylmethylene (isopropylidene)", "diphenylmethylene", "diethylsilylene", "diphenylsilylene" or "dimethoxysilylene"; compounds formed by changing the term "dichloride" contained therein to the term "diethoxide", "di-n-propoxide", "diisopropoxide", "di-n-butoxide", "diisobutoxide", "di-tert-butoxide", "diphenoxide", "di(pentafluorophenoxide)" or "di(2,6-di-tert-butylphenoxide)"; and compounds formed by changing the term "trichloride" contained therein to the term "triethoxide", "tri-n-propoxide", "triisopropoxide", "tri-n-butoxide", "triisobutoxide", "tri-tert-butoxide", "triphenoxide", "tri(pentafluorophenoxide)" or "tri(2,6-di-tert-butylphenoxide)".

Further examples of said transition metal compound are dimethylsilylene(cyclopentadienyl)(2-phenoxy)titanium dichloride, dimethylsilylene(cyclopentadienyl) (3-methyl-2-phenoxy)titanium dichloride, dimethylsilylene(cyclopentadienyl)(3,5-dimethyl-2-phenoxy) titanium dichloride, dimethylsilylene(cyclopentadienyl)(3-tert-butyl-2-phenoxy) titanium dichloride, dimethylsilylene(cyclopentadienyl)(3-tert-butyl-5-methyl-2-phenoxy)titanium dichloride, dimethylsilylene(cyclopentadienyl)(3,5-di-tert-butyl-2-phenoxy)titanium dichloride, dimethylsilylene(cyclopentadienyl)(5-methyl-3-phenyl-2-phenoxy)titanium dichloride, dimethylsilylene(cyclopentadienyl)(3-tert-butyldimethylsilyl-5-methyl-2-phenoxy)titanium dichloride, dimethylsilylene(cyclopentadienyl)(5-methyl-3-trimethylsilyl-2-phenoxy)titanium dichloride, dimethylsilylene (cyclopentadienyl)(3-tert-butyl-5-methoxy-2-phenoxy) titanium dichloride, dimethylsilylene(cyclopentadienyl)(3-tert-butyl-5-chloro-2-phenoxy)titanium dichloride, dimethylsilylene(cyclopentadienyl)(3,5-diamyl-2-phenoxy) titanium dichloride, dimethylsilylene(cyclopentadienyl)(3-phenyl-2-phenoxy) titanium dichloride and dimethylsilylene (cyclopentadienyl)(1-naphthox-2-yl)titanium dichloride; compounds formed by changing the term "titanium" contained in each of the above-mentioned compounds to the term "zirconium" or "hafnium"; compounds formed by changing the term "cyclopentadienyl" contained therein to the term "methylcyclopentadienyl", "n-butylcyclopentadienyl", "tert-butylcyclopentadienyl", "tetramethlycyclopentadienyl", "trimethylsilylcyclopentadienyl", "indenyl" or "fluorenyl"; compounds formed by changing the term "(2-phenoxy)" contained therein to the term "(3-phenyl-2-phenoxy)", "(3-trimethylsilyl-2-phenoxy)" or "(3-tert-butyldimethylsilyl-2-phenoxy)"; compounds formed by changing the term "dimethylsilylene" contained therein to the term "methylene", "ethylene", "dimethylmethylene (isopropylidene)", "diphenylmethylene", "diethylsilylene", "diphenylsilylene" or "dimethoxysilylene"; and compounds formed by changing the term "dichloride" contained therein to the term "diethoxide", "di-n-propoxide", "diisopropoxide", "di-n-butoxide", "diisobutoxide", "di-tert-butoxide", "diphenoxide", "di(pentafluorophenoxide)" or "di(2,6-di-tert-butylphenoxide)".

Specific examples of the transition metal compound represented by the formula [4], wherein the transition metal atom is a nickel atom, are 2,2'-methylenebis[(4R)-4-phenyl-5,5'-dimethyloxazoline]nickel dichloride, 2,2'-methylenebis [(4R)-4-phenyl-5,5'-diethyloxazoline]nickel dichloride, 2,2'-methylenebis[(4R)-4-phenyl-5,5'-di-n-propyloxazoline] nickel dichloride, 2,2'-methylenebis[(4R)-4-phenyl-5,5'-diisopropyloxazoline]nickel dichloride, 2,2'-methylenebis [(4R)-4-phenyl-5,5'-dicyclohexyloxazoline]nickel dichloride, 2,2'-methylenebis[(4R)-4-phenyl-5,5'-dimethoxyoxazoline]nickel dichloride, 2,2'-methylenebis [(4R)-4-phenyl-5,5'-diethoxyoxazoline]nickel dichloride, 2,2'-methylenebis[(4R)-4-phenyl-5,5'-diphenyloxazoline] nickel dichloride, 2,2'-methylenebis[(4R)-4-phenyl-5,5-di-(2-methylphenyl) oxazoline]nickel dichloride, 2,2'-methylenebis[(4R)-4-phenyl-5,5-di-(3-methylphenyl) oxazoline] nickel dichloride, 2,2'-methylenebis[(4R)-4-phenyl-5,5-di-(4-methylphenyl) oxazoline]nickel dichloride, 2,2'-methylenebis[(4R)-4-phenyl-5,5-di-(2-methoxyphenyl) oxazoline]nickel dichloride, 2,2'-methylenebis[(4R)-4-phenyl-5,5-di-(3-methoxyphenyl) oxazoline]nickel dichloride, 2,2'-methylenebis[(4R)-4-phenyl-5,5-di-(4-methoxyphenyl) oxazoline]nickel dichloride, 2,2'-methylenebis[spiro{(4R)-4-phenyloxazoline-5,1'-cyclobutane}]nickel dichloride, 2,2'-methylenebis[spiro{(4R)-4-phenyloxazoline-5,1'-cyclopentane}]nickel dichloride, 2,2'-methylenebis(spiro{(4R)-4- phenyloxazoline-5,1'-cyclohexane)}nickel dichloride and 2,2'-methylenebis[spiro{(4R)-4-phenyloxazoline-5,1'-cycloheptane}]nickel dichloride; and antipodes of the above-mentioned respective compounds; compounds formed by reversing a steric configuration of an asymmetric carbon on one oxazoline ring contained in each of the above-mentioned bisoxazoline compounds; compounds formed by changing the term "-4-phenyl" contained in each of the above-mentioned compounds to the term "-4-methyl", "-4-isopropyl", "-4-isobutyl", "-4-tert-butyl" or "-4-benzyl"; and compounds formed by changing the term "dichloride" contained therein to the term "diethoxide", "di-n-propoxide", "diisopropoxide", "di-n-butoxide", "diisobutoxide", "di-tert-butoxide", "diphenoxide", "di(pentafluorophenoxide)" or "di(2,6-di-tert-butylphenoxide)".

Further specific examples of said nickel compound are [hydrotris(3,5-dimethylpyrazolyl)borate]nickel chloride, [hydrotris(3,5-diethylpyrazolyl)borate]nickel chloride and [hydrotris(3,5-di-tert-butylpyrazolyl)borate]nickel chloride; and compounds formed by changing the term "chloride" contained in each of the above-mentioned compounds to the term "ethoxide", "n-propoxide", "isopropoxide", "n-butoxide", "isobutoxide", "tert-butoxide", "phenoxide", "pentafluorophenoxide" or "2,6-di-tert-butylphenoxide".

Still further examples of said nickel compound are compounds represented by the following formula,

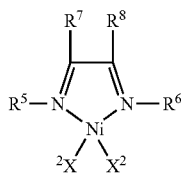

wherein each of $R^5$ and $R^6$ is a 2,6-diisopropylphenyl group; each of $R^7$ and $R^8$ is independently of each other a hydrogen atom or a methyl group; $R^7$ and $R^8$ may be connected with each other to form an acenaphthene group; and $X^2$ is a fluorine atom, a chlorine atom, a bromine atom, an iodine atom, a methyl group, an ethyl group, a n-propyl group, an isopropyl group, a n-butyl group, a phenyl group, a benzyl grop, a methoxy group, an ethoxy group, a n-propoxy group, an isopropoxy group, a n-butoxy group, an isobutoxy group or a phenoxy group. There are also exemplified compounds, which are formed by changing "Ni" contained in the above formula to "Pd", "Co", "Rh" or "Ru".

Specific examples of the transition metal compound represented by the formula [4], wherein the transition metal atom is an iron atom, are 2,6-bis-[1-(2,6-dimethylphenylimino) ethyl]pyridineiron dichloride, 2,6-bis-[1-(2,6-diisopropylphenylimino)ethyl]pyridineiron dichloride and 2,6-bis-[1-(2-tert-butyl-phenylimino)ethyl]pyridineiron dichloride; and compounds formed by changing the term "dichloride" contained in each of the above-mentioned compounds to the term "diethoxide", "di-n-propoxide", "diisopropoxide", "di-n-butoxide", "diisobutoxide", "di-tert-butoxide", "diphenoxide", "di(pentafluorophenoxide)" or "di(2,6-di-tert-butylphenoxide)".

Further specific examples of said iron compound are [hydrotris(3,5-dimethylpyrazolyl)borate]iron chloride, [hydrotris(3,5-diethylpyrazolyl)borate]iron chloride and [hydrotris(3,5-di-tert-butylpyrazolyl)borate]iron chloride; compounds formed by changing the term "chloride" contained in each of the above-mentioned compounds to the term "ethoxide", "n-propoxide", "isopropoxide", "n-butoxide", "isobutoxide", "tert-butoxide", "phenoxide", "pentafluorophenoxide" or "2,6-di-tert-butylphenoxide"; and compounds formed by changing the term "iron" contained therein to the term "cobalt" or "nickel".

Further specific examples of the μ-oxo type transition metal compound represented by the formula [4], wherein the transition metal atom is a nickel atom, are μ-oxobis[isopropylidene(cyclopentadienyl)(2-phenoxy)titanium chloride], μ-oxobis[isopropylidene(cyclopentadienyl) (3-tert-butyl-5-methyl-2-phenoxy)titanium chloride], μ-oxobis[isopropylidene(methylcyclopentadienyl) (2-phenoxy)titanium chloride], μ-oxobis[isopropylidene (methylcyclopentadienyl)(3-tert-butyl-5-methyl-2-phenoxy)titanium chloride], μ-oxobis[isopropylidene(tetramethylcyclopentadienyl) (2-phenoxy) titanium chloride], μ-oxobis[isopropylidene (tetramethylcyclopentadienyl)(3-tert-butyl-5-methyl-2-phenoxy)titanium chloride], μ-oxobis[dimethylsilylene(cyclopentadienyl) (2-phenoxy)titanium chloride], μ-oxobis[dimethylsilylene (cyclopentadienyl)(3-tert-butyl-5-methyl-2-phenoxy)titanium chloride], μ-oxobis[dimethylsilylene (methylcyclopentadienyl)(2-phenoxy)titanium chloride], μ-oxobis[dimethylsilylene(methylcyclopentadienyl) (3-tert-butyl-5-methyl-2-phenoxy)titanium chloride], μ-oxobis [dimethylsilylene(tetramethylcyclopentadienyl) (2-phenoxy)titanium chloride] and μ-oxobis[dimethylsilylene (tetramethylcyclopentadienyl)(3-tert-butyl-5-methyl-2-phenoxy)titanium chloride]; and compounds formed by changing the term "chloride" contained in each of the above-mentioned compounds to the term "ethoxide", "n-propoxide", "isopropoxide", "n-butoxide", "isobutoxide", "tert-butoxide", "phenoxide", "pentafluorophenoxide" or "2,6-di-tert-butylphenoxide".

The above-mentioned transition metal compounds may be used singly, or in combination of two or more thereof.

Among the above-mentioned transition metal compounds, those represented by the above-mentioned formula [4] are preferably used as the transition metal compound (B) in the present invention, and among them, preferred is a transition metal compound containing an atom of Group 4 as $M^2$ in the above-mentioned formula [4], and particularly preferred is a transition metal compound having at least one cyclopentadiene type anion skeleton-containing group as $L^2$ in the above-mentioned formula [4].

(C) Organoaluminum Compound

The organoaluminum compound (C) used in the present invention may be an organoaluminum compound known in the art. Preferred is an organoaluminum compound represented by the following formula [7], $$R^9{}_c AlY_{3-c} \qquad [7]$$

Wherein $R^9$ is a hydrocarbon group, and all of $R^9$ are the same as or different from one another; Y is a hydrogen atom, a halogen atom, an alkoxy group, a aralkyloxy group or an aryloxy group, and all of Y are the same as or different from one another; and c is a number satisfying 0<c<3.

$R^9$ in the formula [7] is preferably a hydrocarbon group having 1 to 24 carbon atoms, and more preferably an alkyl group having 1 to 24 carbon atoms. Specific examples thereof are a methyl group, an ethyl group, a n-propyl group, a n-butyl group, an isobutyl group, a n-hexyl group, a 2-methylhexyl group and a n-octyl group. Among them, preferred is an ethyl group, a n-butyl group, an isobutyl group, a n-hexyl group or a n-octyl group.

Specific examples of the halogen atom of Y in the formula [7] are a fluorine atom, a chlorine atom, a bromine atom and an iodine atom, and preferred is a chlorine atom.

The above-mentioned alkoxy group of Y in the formula [7] is preferably an alkoxy group having 1 to 24 carbon atoms. Specific examples thereof are a methoxy group, an ethoxy group, a n-propoxy group, an isopropoxy group, a n-butoxy group, a sec-butoxy group, a tert-butoxy group, a n-pentoxy group, a neopentoxy group, a n-hexoxy group, a n-octoxy group, a n-dodecoxy group, a n-pentadecoxy group and a n-eicoxy group, and preferred is a methoxy group, an ethoxy group or a tert-butoxy group.

The above-mentioned aryloxy group of Y in the formula [7] is preferably an aryloxy group having 6 to 24 carbon atoms. Specific examples thereof are a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 3,4,5-trimethylphenoxy group, a 2,3,4,5-tetramethylphenoxy group, a 2,3,4,6-tetramethylphenoxy group, a 2,3,5,6-tetramethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphtoxy group and an anthracenoxy group.

The above-mentioned aralkyloxy group of Y in the formula [7] is preferably an aralkyloxy group having 7 to 24 carbon atoms. Specific examples thereof are a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a (n-tetradecylphenyl)methoxy group, a naphthylmethoxy group and an anthracenylmethoxy group. Preferred is a benzyloxy group.

Specific examples of the organoaluminum compound represented by the formula [7] are a trialkylaluminum such as trimethylaluminum, triethylaluminum, tri-n-propylaluminum, tri-n-butylaluminum, triisobutylaluminum, tri-n-hexylaluminum and tri-n-octylaluminum; a dialkylaluminum chloride such as dimethylaluminum chloride, diethylaluminum chloride, di-n-propylaluminum chloride, di-n-butylaluminum chloride, diisobutylaluminum chloride and di-n-hexylaluminum chloride; an alkylaluminum dichloride such as methylaluminum dichloride, ethylaluminum dichloride, n-propylaluminum dichloride, n-butylaluminum dichloride, isobutylaluminum dichloride and n-hexylaluminum dichloride; a dialkylaluminum hydride such as dimethylaluminum hydride, diethylaluminum hydride, di-n-propylaluminum hydride, di-n-butylaluminum hydride, diisobutylaluminum hydride and di-n-hexylaluminum hydride; an alkyl(dialkoxy) aluminum such as methy(dimethoxy)aluminum, methyl(diethoxy)aluminum and methyl(di-tert-butoxy)aluminum; a dialkyl(alkoxy)aluminums such as dimethy(methoxy)aluminum, dimethyl(ethoxy)aluminum and dimethyl(tert-butoxy) aluminum; an alkyl(diaryloxy)aluminum such as methyl (diphenoxy)aluminum, methylbis(2,6-diisopropylphenoxy) aluminum and methylbis(2,6-diphenylphenoxy)aluminum; and a dialkyl(aryloxy)aluminum such as dimethyl(phenoxy) aluminum, dimethyl(2,6-diisopropylphenoxy)aluminum and dimethyl(2,6-diphenylphenoxy)aluminum.

Among them, preferred is a trialkylaluminum; further preferred is trimethylaluminum, triethylaluminum, tri-n-butylaluminum, triisobutylaluminum, tri-n-hexylaluminum or tri-n-octylaluminum; and particularly preferred is triisobutylaluminum or tri-n-octylaluminum.

The above-mentioned organoaluminum compounds may be used singly, or in combination of two or more thereof.

The above-mentioned modified particle (A), transition metal compound (B) and organoaluminum compound (C) are hereinafter referred to as the "component (A)", "component (B)" and "component (C)", respectively.

The component (B) is used in an amount of usually from $1\times10^{-6}$ to $1\times10^{-3}$ mol, and preferably from $5\times10^{-6}$ to $5\times10^{-4}$ mol per g of the component (A). The component (C) is used in an amount of preferably from 0.01 to 10,000, more preferably from 0.1 to 5,000, and most preferably from 1 to 2,000 in terms of a molar ratio of an amount of an aluminum atom contained in the component (C) to an amount of a transition metal atom contained in the component (B).

Regarding a method for contacting the components (A), (B) and (C) in the present invention, there may be applied (1) a method comprising the steps of (i) feeding the component (A), the component (B) and optionally the component (C) to a reactor for producing a catalyst for addition polymerization, (ii) contacting them in said reactor, thereby producing a catalyst, and then (iii) feeding said catalyst to a polymerization reactor; or (2) a method comprising the steps of (i) feeding the component (A), the component (B) and optionally the component (C) separately to a polymerization reactor, and (ii) contacting them in said reactor, thereby producing a catalyst for addition polymerization in said reactor, wherein in case of using the components (A), (B) and (C), there may be applied a method comprising the steps of (i) contacting any two components of them to produce a contact product, and then (ii) contacting said contact product with the remaining one component, thereby producing a catalyst for addition polymerization.

A method for feeding the component (A), the component (B) and optionally the component (C) to the above-mentioned reactor for producing a catalyst for addition polymerization, or to the above-mentioned polymerization reactor is not particularly limited. Examples of said feeding method are (1) a method of feeding said solid components, and (2) a method of feeding a solution, suspension or slurry of each of said components prepared using a hydrocarbon solvent substantially free from an ingredient deactivating said components, such as water and oxygen. Examples of said hydrocarbon solvent are an aliphatic hydrocarbon solvent such as butane, pentane, heptane, hexane and octane; an aromatic hydrocarbon solvent such benzene and toluene; and a halogenated hydrocarbon such as methylene chloride. Among them, preferred is an aliphatic hydrocarbon or an aromatic hydrocarbon.

When feeding the above-mentioned solution, suspension or slurry, a concentration of the component (A) is usually from 0.01 to 1000 g/liter, and preferably from 0.1 to 500 g/liter; a concentration of the component (B) is usually from 0.0001 to 1000 mmol/liter, and preferably from 0.01 to 50 mmol/liter as an amount of a transition metal atom contained in the component (B); and a concentration of the component (C) is usually from 0.0001 to 100 mol/liter, and preferably from 0.01 to 10 mol/liter as an amount of an aluminum atom contained in the component (C).

A polymerization method in the process-5 of the present invention is not particularly limited. Examples of said polymerization method are a gas phase polymerization method carried out in a gaseous monomer, a solution polymerization method using a solvent, and a slurry polymerization method using the same. Examples of said solvent are an aliphatic hydrocarbon such as butane, hexane, pentane, heptane and octane; an aromatic hydrocarbon such as benzene and toluene; and a halogenated hydrocarbon such as methylene chloride. There may also be applied a bulk polymerization using a monomer itself such as an olefin as a solvent. Each of the above-mentioned polymerization methods may be a batchwise polymerization method or a continuous polymerization method, both of which may be carried out in two or more steps having different polymerization conditions from each other. A polymerization time may generally be suitably determined depending upon a kind of an addition polymer produced and a polymerization apparatus, and it is generally from 1 minute to 20 hours.

The above-mentioned slurry polymerization method may be carried out according to a slurry polymerization method known in the art, however, is not limited thereto. A preferable slurry polymerization method is a method using a continuous polymerization reactor, which can (1) feed a material such as a monomer and a diluent (explained below), if necessary, continuously, and (2) take out a produced addition polymer continuously or periodically. Examples of said polymerization reactor are a loop reactor and a stirrer-carrying reactor. Further examples of said polymerization reactor are (1) a reactor containing two or more stirrer-carrying reactors different from each other in their structure and/or conditions and connected in series or on a parallel with each other, and (2) a reactor containing a combination of said series and parallel.

An example of the above-mentioned diluent is an inert diluent (medium) such as paraffin, cycloparaffin and an aromatic hydrocarbon. A polymerization temperature is usually from about 0 to about 150° C., and preferably from 30 to 100° C. A polymerization pressure is usually from about 0.1 to about 10 MPa, and preferably from 0.5 to 5 MPa. Said diluent and said polymerization temperature and pressure may be selected such that (1) a catalyst for addition polymerization is kept in a suspension state, (2) the diluent and at least a part of a monomer are kept in a liquid phase, (3) monomers are contacted with each other, and (4) a solid particle-like addition polymer is produced and recovered.

A molecular weight of a produced addition polymer can be controlled by various means known in the art such as regulation of a polymerization temperature and introduction of hydrogen.

The above-mentioned components (A) to (C) and monomers can be fed to a polymerization reactor in any order by any method known in the art. An example of said feeding method is a method comprising the step of feeding the components (A) to (C) and monomers to a polymerization reactor simultaneously or stepwise. If desired, the components (A) to (C) may be contacted with each other in an inert atmosphere prior to contacting them with the monomers.

The above-mentioned gas phase polymerization method may be carried out according to a gas phase polymerization method known in the art, however, is not limited thereto. An example of a polymerization reactor used in the gas phase polymerization method is a fluidized bed polymerization reactor, and preferred is a fluidized bed polymerization reactor having an expanded part. Said reactor may have a stirrer therein.

Examples of a method for feeding the above-mentioned components (A) to (C) to a polymerization reactor are (1) a method comprising the step of feeding them thereto under a water-free condition generally using hydrogen, ethylene or an inert gas such as nitrogen and argon; and (2) a method comprising the steps of (i) dissolving or diluting them in a solvent to make a solution or a slurry thereof, and then, (ii) feeding the solution or the slurry thereto. Further, examples of a method for feeding the above-mentioned components (A) to (C) to a polymerization reactor are (1) a method comprising the step of feeding them thereto separately, and (2) a method comprising the steps of (i) contacting optionally selected components in an optional contacting order to make a contact product, and then, (ii) feeding said contact product thereto.

A polymerization temperature is lower than a melting point of the produced addition polymer, preferably from 0 to 150° C., and particularly preferably from 30 to 100° C. Also, there may be used a molecular weight-controlling agent such as hydrogen in order to control melt flowability of the produced addition polymer. Further, an addition polymerizable monomer or a mixed gas containing said monomer and hydrogen may contain an inert gas.

In the present invention, there may be carried out the following pre-polymerization prior to the above-mentioned polymerization (real polymerization).

The pre-polymerization is carried out, preferably in a slurry state using a solvent, by the above-mentioned process-2 comprising the steps of (1) contacting the above-mentioned components (A) and (B) and optionally the above-mentioned component (C), thereby producing a primary catalyst, and (2) pre-polymerizing a small amount of one or more kinds of olefins in the presence of the primary catalyst. An example of the solvent for the above-mentioned slurry state is an inert hydrocarbon such as propane, butane, isobutane, pentane, isopentane, hexane, heptane, octane, cyclohexane, benzene and toluene. When making the slurry, a partial or total amount of said inert hydrocarbon may be replaced with a liquid olefin.

In the pre-polymerization, the component (C) may be used within a wide range such as a range of from 0.5 to 700 mol per mol of the component (B); and preferably from 0.8 to 500 mol per mol thereof, and particularly preferably from 1 to 200 mol per mol thereof.

In the pre-polymerization, an olefin is pre-polymerized in an amount of generally from 0.01 to 1000 g per g of the component (A), preferably from 0.05 to 500 g per g thereof, and particularly preferably from 0.1 to 200 g per g thereof.

A slurry concentration in the pre-polymerization is preferably from 0.1 to 50 g-component (A)/liter-solvent, and particularly preferably from 0.5 to 20 g-component (A)/liter-solvent. A pre-polymerization temperature is preferably from −20 to 100° C., and particularly preferably from 0 to 80° C. A partial pressure of the olefin in the gas phase during the pre-polymerization is preferably from 0.001 to 2 MPa, and particularly preferably from 0.01 to 1 MPa, excepting an olefin, which is liquid under the pre-polymerization pressure and at the pre-polymerization temperature. A pre-polymerization time is not particularly limited, and is preferably usually from 2 minutes to 15 hours.

Examples of a method for feeding the components (A) to (C) and the olefin in the pre-polymerization are (1) a method comprising the steps of (i) feeding the components (A) and (B) and optionally the component (C) to contact them, and then (ii) feeding the olefin; (2) a method comprising the steps of (i) feeding the components (A) and (B) and olefin to contact them, and then (ii) feeding the component (C); and (3) a method comprising the steps of (i) contacting the component (B) with the component (C) in the presence of the olefin, and then (ii) feeding the component (A). Among them, preferred is the method (2) or the method (3). Examples of a method for feeding the olefin are (1) a method comprising the step of feeding the olefin stepwise while keeping an inner pressure of a polymerization reactor at a predetermined pressure; and (2) a method comprising the step of feeding first the predetermined total amount of the olefin. A chain transfer agent such as hydrogen may be added to a polymerization reactor in order to control a molecular weight of a pre-polymer produced.

In the present invention, a product produced by the above-mentioned pre-polymerization can be used as a catalyst component (pre-polymerized catalyst component for addition polymerization), or as a catalyst. Said catalyst is a catalyst for addition polymerization, which can be produced by pre-polymerizing an olefin in the presence of the above-mentioned primary catalyst produced by contacting the components (A) and (B) and optionally the component (C).

Examples of an addition polymerizable monomer in a real polymerization are an olefin, a diolefin, a cyclic olefin, an alkenyl aromatic hydrocarbon and a polar monomer, each thereof having 2 to 30 carbon atoms. Those monomers may be used singly or in combination of two or more thereof.

Specific examples of the above-mentioned monomers are an olefin such as ethylene, propylene, 1-butene, 1-pentene, 4-methyl-1-pentene, 5-methyl-1-hexene, 1-hexene, 1-heptene, 1-octene, 1-nonene, 1-decene and vinylcyclohexane; a diolefin such as 1,5-hexadiene, 1,4-hexadiene, 1,4-pentadiene, 1,7-octadiene, 1,8-nonadiene, 1,9-decadiene, 4-methyl-1,4-hexadiene, 5-methyl-1,4-hexadiene, 7-methyl-1,6-octadiene, 5-ethylidene-2-norbornene, dicyclopentadiene, 5-vinyl-2-norbornene, norbornadiene, 5-methylene-2-norbornene, 1,5-cyclooctadiene, 5,8-endomethylenehexahydronaphthalene, 1,3-butadiene, isoprene, 1,3-hexadinene, 1,3-octadiene, 1,3-cyclooctadiene and 1,3-cyclohexadiene; a cyclic olefin such as norbornene, 5-methyl-2-norbornene, 5-ethyl-2-norbornene, 5-butyl-2-norbornene, 5-phenyl-2-norbornene, 5-benzyl-2-norbornene, tetracyclododecene, tricyclodecene, tricycloundecene, pentacyclopentadecene, pentacyclohexadecene, 8-methyltetracyclododecene, 8-ethyltetracyclododecene, 5-acetyl-2-norbornene, 5-acetyloxy-2-norbornene, 5-methoxycarbonyl-2-norbornene, 5-ethoxycarbonyl-2-norbornene, 5-methyl-5-methoxycarbonyl-2-norbornene, 5-cyano-2-norbornene, 8-methoxycarbonyltetracyclododecene, 8-methyl-8-tetracyclododecene and 8-cyanotetracyclododecene; an alkenylbenzene such as styrene, 2-phenylpropylene, 2-phenylbutene and 3-phenylpropylene; an alkylstyrene such as p-methylstyrene, m-methylstyrene, o-methylstyrene, p-ethylstyrene, m-ethylstyrene, o-ethylstyrene, α-methylstyrene, 2,4-dimethylstyrene, 2,5-dimethylstyrene, 3,4-dimethylstyrene, 3,5-dimethylstyrene, 3-methyl-5-ethylstyrene, 1,1-diphenylstyrene, p-tert-butylstyrene and p-sec-butylstyrene; an alkenyl aromatic hydrocarbon such as a bisalkenylbenzene (for example, divinylbenzene) and an alkenylnaphthalene (for example, 1-vinylnaphthalene); and a polar monomer such as an α, β-unsaturated carboxylic acid (for example, acrylic acid, methacrylic acid, fumaric acid, maleic anhydride, itaconic acid, itaconic anhydride and bicyclo(2,2,1)-5-heptene-2,3-dicarboxylic acid); a salt of the α, β-unsaturated carboxylic acid with a metal such as sodium, potassium, lithium, zinc, magnesium and calcium; an α, β-unsaturated carboxylic acid ester (for example, methyl acrylate, ethyl acrylate, n-propyl acrylate, isopropyl acrylate, tert-butyl acrylate, 2-ethylhexyl acrylate, methyl methacrylate, ethyl methacrylate, n-propyl methacrylate, isopropyl methacrylate, n-butyl methacrylate and isobutyl methacrylate); an unsaturated dicarboxylic acid (for example, maleic acid and itaconic acid); a vinyl ester (for example, vinyl acetate, vinyl propionate, vinyl caproate, vinyl caprate, vinyl laurate, vinyl stearate and vinyl trifluoroacetate); and an unsaturated carboxylic acid glycidyl ester (for example, glycidyl acrylate, glycidyl methacrylate and monoglycidyl itaconate).

In the present invention, each of the above-mentioned monomers is homopolymerized, or any combination of said monomers is copolymerized. Examples of said combination are ethylene-propylene, ethylene-1-butene, ethylene-1-hexene, ethylene-1-octene, propylene-1-butene, ethylene-propylene-butene and ethylene-propylene-1-hexene.

The catalyst for addition polymerization in the present invention is suitably used for producing an olefin polymer. An example of said olefin polymer is particularly preferably an ethylene-α-olefin copolymer, and among them, preferred is an ethylene-α-olefin copolymer having a polyethylene crystalline structure, wherein the α-olefin has preferably 3 to 8 carbon atoms such as 1-butene, 1-hexene and 1-octene.

EXAMPLE

The present invention is explained in more detail with reference to the following Examples, but the present invention is not limited thereto.

Respective items in the following Examples and Comparative Examples were measured by the following methods.

1. Content of an α-Olefin Unit in an Addition Polymer

The term "α-olefin unit" and the below-mentioned term "ethylene unit" mean a polymerized α-olefin unit contained in the addition polymer, and a polymerized ethylene unit contained therein, respectively. The captioned content was measured by a method comprising the steps of:

(1) measuring an infrared absorption spectrum of the addition polymer with an infrared spectrophotometer, FT-IR 7300, manufactured by Japan Spectroscopic Co., Ltd., and (2) determining the captioned content from characteristic absorptions of an ethylene unit and an α-olefin unit using a calibration curve prepared in advance, wherein the captioned content was expressed in terms of a short chain branch number (SCB) per 1,000 carbon atoms.

2. Melt Flow Rate (MFR: g/10 Minutes)

It was measured according to the method prescribed in Japanese Industrial Standards (JIS) K7210-1995 at 190° C. under a load of 21.18 N (2.16 kg). As a sample, a polymer containing 1000 ppm of an antioxidant was used.

3. Swelling Ratio (SR)

It was measured by dividing a diameter of a strand obtained in the above-mentioned Item 2 (MFR) by an inner diameter of a die (2.095 mm).

4. Melt Flow Rate Ratio (MFRR)

It was measured by dividing a melt flow rate, which was measured using an addition polymer containing 1,000 ppm of an antioxidant according to the method prescribed in JIS K7210-1995 at 190° C. under a load of 211.82 N (21.60 kg), by a melt flow rate, which was measured using the same according thereto at 190° C. under a load of 21.18 N (2.16 kg).

5. Elementery Analysis (1) Al

An amount of Al contained in the component (A) was measured by a method comprising the steps of:
(i) putting the component (A) into ethanol,
(ii) adding a sulfuric acid aqueous solution (1 mol/liter) thereto,
(iii) applying a supersonic wave thereto to extract a metal component, and
(iv) measuring an amount of the metal component contained in the extracted liquid according to an ICP emission spectrochemical analysis.

(2) Si

An amount of Si contained in the component (A) was measured by a method comprising the steps of:
(i) putting the component (A) into a sulfuric acid aqueous solution (1 mol/liter),
(ii) adding sulfuric acid (95% by weight) thereto,
(iii) heating and evaporating to dryness, thereby obtaining a solid,
(iv) weighing the solid ($W_1$),
(v) adding sulfuric acid (95% by weight) and hydrofluoric acid (50% by weight) to the solid,
(vi) heating and evaporating to dryness, thereby obtaining a solid,
(vii) weighing the solid ($W_2$), and
(viii) measuring an amount of Si from the difference of "$W_1 - W_2$".

(3) F

An amount of F contained in the component (A) was measured by a method comprising the steps of:
(i) burning the component (A) in a flask filled with oxygen, thereby generating a combustion gas,
(ii) absorbing the gas in a sodium hydroxide aqueous solution (10%), and
(iii) measuring an amount of F using the aqueous solution according to an ion selective electrode method.

Example 1

(1) Production of the Component (A1)

Into a 100 ml four necked flask purged with nitrogen, 18.0 ml of toluene and 12.5 ml (25.0 mmol of trimethylaluminum) of a toluene solution (concentration=2.00 mol/liter) of trimethylaluminum were put, and the resultant mixture was cooled to 5° C. To the cooled mixture, 4.6 ml (33.3 mmol) of 1,1,1,3,3,3-hexafluoro-2-(trifluoromethyl)-2-propanol was added dropwise over 0.25 hour, and then, the mixture was stirred for 1.5 hours at 5° C. To the mixture, there was added 4.98 g of silica (SYLOPOL 948, manufactured by Davison Co., Ltd.; average particle diameter=60 μm; pore volume=1.70 ml/g; and specific surface area=292 m²/g), which had been heated at 300° C. in a stream of nitrogen. Silica adhering to the inner wall of the flask was washed down with 5.0 ml of toluene. The mixture was stirred for 5 minutes, and then, 0.44 ml (24.5 mmol) of water was added dropwise thereto over 0.5 hour. Thereafter, the mixture was stirred at 5° C. for 1 hour, at 40° C. for 1 hour, and then, at 80° C. for 2 hours, in this order. The resultant solid was washed four times at 80° C. using a filter with 50.0 ml each of toluene, and then washed two times at room temperature using the same with 50.0 ml each of hexane, in this order. The washed solid was dried under a reduced pressure at 60° C. for 1 hour, thereby producing 11.22 g of the component (A1) as the component (A).

(2) Polymerization

A 3 liter-volume autoclave equipped with a stirrer, which had been dried under a reduced pressure and then purged with argon, was evacuated. Into the autoclave, hydrogen was fed so as to obtain its partial pressure of 0.022 MPa, and then, 690 g of butane and 60 g of 1-butene were fed thereto. The resultant mixture was heated to 70° C. Thereafter, ethylene was fed thereto so as to obtain its partial pressure of 1.6 Mpa, and the system was stabilized. A gas chromatography analysis showed a gas composition in the system of hydrogen=1.07% by mol and 1-butene=3.42% by mol. To the mixture, there was added 0.9 ml of a hexane solution (concentration=1 mmol/ml) of triisobutylaluminum. Next, 0.50 ml of a toluene solution (concentration=2 μmol/ml) of racemic ethylenebis (1-indenyl)zirconium dichloride, and 7.3 mg of the component (A1) (solid catalyst component) produced in the above Example 1 (1) were added thereto in this order. Polymerization was carried out at 70° C. for 20 minutes, during which a mixed gas of ethylene and hydrogen (hydrogen concentration=0.45% by mol) was continuously fed thereto so as to keep the total pressure constant. As a result, there was produced 110 g of an olefin polymer having good particle properties. A polymerization activity per mol of a zirconium atom was $3.3 \times 10^8$ g/mol-Zr/hour, and that per g of the solid catalyst component was 45,200 g/g-solid catalyst component/hour. The produced olefin polymer had SCB=6.60, MFR=0.34, MFRR=80 and SR=1.26.

Example 2

(1) Production of the Component (A2)

Example 1 (1) was repeated except that (i) 18.0 ml of toluene was changed to 27.0 ml thereof, (ii) 12.5 ml (25.0 mmol of trimethylaluminum) of a toluene solution of trimethylaluminum was changed to 3.4 ml (25 mmol) of triethylaluminum, and (iii) 4.98 g of silica was changed to 4.95 g thereof, thereby producing 10.66 g of the component (A2) as the component (A).

(2) Polymerization

Example 1 (2) was repeated except that (i) 7.3 mg of the component (A1) was changed to 5.5 mg of the component (A2) produced in the above Example 2 (1), (ii) the gas composition in the system was changed to hydrogen=1.10% by mol and 1-butene=3.47% by mol, and (iii) the polymerization time was changed to 60 minutes.

As a result, there was produced 130 g of an olefin polymer having good particle properties. A polymerization activity per mol of a zirconium atom was $1.3 \times 10^8$ g/mol-Zr/hour, and that per g of the solid catalyst component was 23,600 g/g-solid catalyst component/hour. The produced olefin polymer had SCB 16.70, MFR=0.68, MFRR=74 and SR=1.35.

Example 3

(1) Production of the Component (A3)

Example 1 (1) was repeated except that (i) 4.6 ml (33.3 mmol) of 1,1,1,3,3,3-hexafluoro-2-(trifluoromethyl)-2-propanol was changed to 3.5 ml (33.3 mmol) of 1,1,1,3,3,3-hexafluoro-2-propanol, and (ii) stirring for 1.5 hours at 5° C. was changed to (a) stirring for 0.5 hour at 5° C., (b) stirring for 1 hour at 40° C., and then (c) cooling to 5° C., in this order, thereby producing 9.46 g of the component (A3) as the component (A). An elementary analysis of the component (A3) showed a result of Al=2.3 mmol/g, Si=8.5 mmol/g and F=8.9 mmol/g.

(2) Polymerization

Example 1 (2) was repeated except that (i) 7.3 mg of the component (A1) was changed to 6.6 mg of the component (A3) produced in the above Example 3 (1), (ii) the gas composition in the system was changed to hydrogen=0.98% by mol and 1-butene=3.52% by mol, (iii) the hydrogen concentration of 0.45% by mol in the mixed gas of ethylene and hydrogen continuously fed was changed to 0.42% by mol, and (iv) the polymerization time was changed to 60 minutes.

As a result, there was produced 97 g of an olefin polymer having good particle properties. A polymerization activity per mol of a zirconium atom was $9.7 \times 10^7$ g/mol-Zr/hour, and that per g of the solid catalyst component was 14,700 g/g-solid catalyst component/hour. The produced olefin polymer had SCB=18.4, MFR=3.9, MFRR=40 and SR=1.41.

Example 4

(1) Production of the Component (A4)

Example 1 (1) was repeated except that (i) 18.0 ml of toluene was changed to 27.0 ml thereof, (ii) 12.5 ml (25.0 mmol of trimethylaluminum) of a toluene solution of trimethylaluminum was changed to 3.4 ml (25 mmol) of triethylaluminum, (iii) 4.6 ml (33.3 mmol) of 1,1,1,3,3,3-hexafluoro-2-(trifluoromethyl)-2-propanol was changed to 3.5 ml (33.3 mmol) of 1,1,1,3,3,3-hexafluoro-2-propanol, (iv) the stirring for 1.5 hours at 5° C. was changed to (a) stirring for 0.5 hour at 5° C., (b) stirring for 1 hour at 40° C., and then (c) cooling to 5° C., in this order, and (v) 4.98 g of silica was changed to 4.99 g thereof, thereby producing 9.19 g of the component (A4) as the component (A). An elementary analysis of the component (A4) showed a result of Al=1.8 mmol/g, Si=9.6 mmol/g and F=6.3 mmol/g.

(2) Polymerization

Example 1 (2) was repeated except that (i) 7.3 mg of the component (A1) was changed to 6.4 mg of the component (A4) produced in the above Example 4 (1), (ii) the gas composition in the system was changed to hydrogen=1.06% by mol and 1-butene=3.67% by mol, (iii) the hydrogen concentration of 0.45% by mol in the mixed gas of ethylene and hydrogen continuously fed was changed to 0.42% by mol, and (iv) the polymerization time was changed to 60 minutes.

As a result, there was produced 82 g of an olefin polymer having good particle properties. A polymerization activity per mol of a zirconium atom was $8.2 \times 10^7$ g/mol-Zr/hour, and that per g of the solid catalyst component was 12,800 g/g-solid catalyst component/hour. The produced olefin polymer had SCB=19.2, MFR=4.6, MFRR=44 and SR=1.44.

Example 5

(1) Production of the Component (A5)

Example 1 (1) was repeated except that (i) 4.6 ml (33.3 mmol) of 1,1,1,3,3,3-hexafluoro-2-(trifluoromethyl)-2-propanol was changed to 2.4 ml (33.3 mmol) of 2,2,2-trifluoroethanol, and (ii) 4.98 g of silica was changed to 5.03 g thereof, thereby producing 8.79 g of the component (A5) as the component (A).

(2) Polymerization

Example 1 (2) was repeated except that (i) 7.3 mg of the component (A1) was changed to 6.2 mg of the component (A5) produced in the above Example 5 (1), (ii) the gas composition in the system was changed to hydrogen=1.01% by mol and 1-butene=3.09% by mol, (iii) the hydrogen concentration of 0.45% by mol in the mixed gas of ethylene and hydrogen continuously fed was changed to 0.43% by mol, and (iv) the polymerization time was changed to 60 minutes.

As a result, there was produced 25 g of an olefin polymer having good particle properties. A polymerization activity per mol of a zirconium atom was $2.5 \times 10^7$ g/mol-Zr/hour, and that per g of the solid catalyst component was 4,000 g/g-solid catalyst component/hour. The produced olefin polymer had SCB=8.7, MFR=3.1, MFRR=28 and SR=1.53.

Example 6

(1) Production of the Component (A6)

Example 1 (1) was repeated except that (i) 18.0 ml of toluene was changed to 27.0 ml thereof, (ii) 12.5 ml (25.0 mmol of trimethylaluminum) of a toluene solution of trimethylaluminum was changed to 3.4 ml (25 mmol) of triethylaluminum, (iii) 4.6 ml (33.3 mmol) of 1,1,1,3,3,3-hexafluoro-2-(trifluoromethyl)-2-propanol was changed to 2.4 ml (33.3 mmol) of 2,2,2-trifluoroethanol, and (iv) 4.98 g of silica was changed to 4.95 g thereof, thereby producing 9.01 g of the component (A6) as the component (A).

(2) Polymerization

Example 1 (2) was repeated except that (i) 7.3 mg of the component (A1) was changed to 7.6 mg of the component (A6) produced in the above Example 6 (1), (ii) the gas composition in the system was changed to hydrogen=1.04% by mol and 1-butene=3.05% by mol, (iii) the hydrogen concentration of 0.45% by mol in the mixed gas of ethylene and hydrogen continuously fed was changed to 0.43% by mol, and (iv) the polymerization time was changed to 60 minutes.

As a result, there was produced 15 g of an olefin polymer having good particle properties. A polymerization activity per mol of a zirconium atom was $1.5 \times 10^7$ g/mol-Zr/hour, and that per g of the solid catalyst component was 2,000 g/g-solid catalyst component/hour. The produced olefin polymer had SCB=8.6, MFR=2.9, MFRR=27 and SR=1.54.

Example 7

(1) Production of the Component (A7)

Example 1 (1) was repeated except that (i) 4.6 ml (33.3 mmol) of 1,1,1,3,3,3-hexafluoro-2-(trifluoromethyl)-2-propanol was changed to 3.5 ml (33.3 mmol) of 1,1,1,3,3,3-hexafluoro-2-propanol, and (ii) 4.98 g of silica was changed to 4.92 g thereof, thereby producing 9.84 g of the component (A7) as the component (A). An elementary analysis of the component (A7) showed a result of Al=2.3 mmol/g, Si=8.2 mmol/g and F=8.9 mmol/g.

(2) Polymerization

Example 1 (2) was repeated except that (i) 7.3 mg of the component (A1) was changed to 6.0 mg of the component (A7) produced in the above Example 7 (1), (ii) the gas composition in the system was changed to hydrogen=1.05% by mol and 1-butene=3.62% by mol, (iii) the hydrogen concentration of 0.45% by mol in the mixed gas of ethylene and hydrogen continuously fed was changed to 0.42% by mol, and (iv) the polymerization time was changed to 60 minutes.

As a result, there was produced 78 of an olefin polymer having good particle properties. A polymerization activity per mol of a zirconium atom was $7.8 \times 10^7$ g/mol-Zr/hour, and that per g of the solid catalyst component was 13,000 g/g-solid catalyst component/hour. The produced olefin polymer had SCB=18.3, MFR=2.6, MFRR=49 and SR=1.45.

Example 8

(1) Production of the Component (A8)

Example 1 (1) was repeated except that (i) 18.0 ml of toluene was changed to 27.0 ml thereof, (ii) 12.5 ml (25.0 mmol of trimethylaluminum) of a toluene solution of trimethylaluminum was changed to 3.4 ml (25 mmol) of triethylaluminum, (iii) 4.6 ml (33.3 mmol) of 1,1,1,3,3,3-hexafluoro-2-(trifluoromethyl)-2-propanol was changed to 3.5 ml (33.3 mmol) of 1,1,1,3,3,3-hexafluoro-2-propanol, and (iv) 4.98 g of silica was changed to 5.00 g thereof, thereby producing 9.55 g of the component (A8) as the component (A). An elementary analysis of the component (A8) showed a result of Al=2.3 mmol/g, Si=8.2 mmol/g and F=7.4 mmol/g.

(2) Polymerization

Example 1 (2) was repeated except that (i) 7.3 mg of the component (A1) was changed to 7.5 mg of the component (A8) produced in the above Example 8 (1), (ii) the gas composition in the system was changed to hydrogen=1.02% by mol and 1-butene=3.57% by mol, (iii) the hydrogen concentration of 0.45% by mol in the mixed gas of ethylene and hydrogen continuously fed was changed to 0.42% by mol, and (iv) the polymerization time was changed to 60 minutes.

As a result, there was produced 117 g of an olefin polymer having good particle properties. A polymerization activity per mol of a zirconium atom was $1.2 \times 10^8$ g/mol-Zr/hour, and that per g of the solid catalyst component was 15,600 g/g-solid catalyst component/hour. The produced olefin polymer had SCB=18.8, MFR=1.9, MFRR=52 and SR=1.34.

Reference Example 1

(1) Polymerization

A 3 liter-volume autoclave equipped with a stirrer, which had been dried under a reduced pressure and then purged with argon, was evacuated. Into the autoclave, 1000 ml of toluene and 30 g of 1-butene were fed thereto. The mixture was heated to 70° C. Thereafter, ethylene was fed thereto so as to obtain its partial pressure of 0.6 Mpa, and the system was stabilized. A gas chromatography analysis showed a gas composition in the system of hydrogen=0% by mol and 1-butene=8.18% by mol. To the mixture, there was added 0.9 ml of a hexane solution (concentration=1 mmol/ml) of triisobutylaluminum. Next, 0.25 ml of a toluene solution (concentration=2 μmol/ml) of racemic ethylenebis(1-indenyl)zirconium diphenoxide, and 2.0 ml of a toluene solution (concentration=0.2 mol/ml) of polymethylaluminoxane having a tradename of PMAO and manufactured by Tosoh-finechem, were added thereto in this order. Polymerization was carried out at 70° C. for 40 minutes, during which an ethylene gas was continuously fed thereto so as to keep the total pressure constant. Thereafter, washing with a hydrochloric acid/methanol solution to remove ashes, and then drying under a reduced pressure were carried out. As a result, there was produced 39 g of an olefin polymer having good particle properties. A polymerization activity per mol of a zirconium atom was $1.2 \times 10^8$ g/mol-Zr/hour. The produced olefin polymer had SCB=16.1 and MFR=5.6.

Reference Example 2

(1) Preparation of Methylaluminoxane

Into a 200 ml four necked flask purged with nitrogen, 90.0 ml of toluene and 10.0 ml (20.0 mmol of trimethylaluminum) of a toluene solution (concentration=2.00 mol/liter) of trimethylaluminum were put, and the resultant mixture was cooled to 5° C. To the mixture, 0.35 ml (19.5 mmol) of water was added dropwise over one hour. Thereafter, the mixture was stirred at 5° C. for 1.5 hours, at 40° C. for two hours, and then at 80° C. for two hours, in this order, thereby obtaining a weakly white slurry having a concentration of 0.2 mol/liter in terms of an aluminum atom.

(2) Polymerization

Reference Example 1 (1) was repeated except that (i) 2.0 ml of a toluene solution of PMAO was changed to 2.0 ml of the slurry obtained in the above Reference Example 2 (1), and (ii) the gas composition in the system was changed to hydrogen=0% by mol and 1-butene=7.31% by mol.

As a result, there was obtained 53 g of an olefin polymer. A polymerization activity per mol of a zirconium atom was $1.6 \times 10^8$ g/mol-Zr/hour. The obtained olefin polymer had SCB=15.7 and MFR=4.8.

Reference Example 3

(1) Preparation of Ethylaluminoxane

Reference Example 2 (1) was repeated except that (i) 90.0 ml of toluene was changed to 97.0 ml thereof, and (ii) 10.0 ml of a toluene solution (concentration=2.00 mol/liter) of trimethylaluminum was changed to 2.7 ml (20 mmol) of triethylaluminum, thereby obtaining a slurry.

(2) Polymerization

Reference Example 1 (1) was repeated except that (i) 2.0 ml of a toluene solution of PMAO was changed to 2.0 ml of the slurry obtained in the above Reference Example 3 (1), and (ii) the gas composition in the system was changed to hydrogen=0% by mol and 1-butene=8.20% by mol.

As a result, there was obtained 26 g of an olefin polymer. A polymerization activity per mol of a zirconium atom was $8.1 \times 10^7$ g/mol-Zr/hour. The obtained olefin polymer had SCB=14.8 and MFR=5.0.

Comparative Example 1

(1) Production of Catalyst Component

Into a 200 ml four necked flask purged with nitrogen, 88.0 ml of toluene and 12.5 ml (25.0 mmol of trimethylaluminum) of a toluene solution (concentration=2.00 mol/liter) of trimethylaluminum were put, and the resultant mixture was cooled to 5° C. To the mixture, 0.44 ml (24.5 mmol) of water was added dropwise over one hour. Thereafter, the mixture was stirred at 5° C. for 1.5 hours, at 40° C. for two hours, and then at 80° C. for two hours, in this order, and the mixture was let alone overnight. The mixture was cooled to 5° C., and then, 4.86 g of silica having the same lot number as that of silica used in Example 1 (1), which had been heated at 300° C. in a stream of nitrogen, was added to the mixture. Next, silica adhering to the inner wall of the flask was washed down with 5.0 ml of toluene. Thereafter, the mixture was stirred at 5° C. for one hour, at 40° C. for one hour, and then at 80° C. for two hours, in this order. The resultant solid was washed four times at 80° C. using a filter with 100.0 ml each of toluene, and then washed two times at room temperature using the same with 100.0 ml each of hexane, in this order. The washed solid was dried under a reduced pressure at 60° C. for one hour to obtain 6.10 g of a solid product. An elementary analysis of the solid product showed a result of Al=3.0 mmol/g and Si=13.2 mmol/g.

(2) Polymerization

Example 1 (2) was repeated except that (i) 7.3 mg of the component (A1) was changed to 7.1 mg of the solid product obtained in the above Comparative Example 1 (1), (ii) the gas composition in the system was changed to hydrogen=0.99% by mol and 1-butene=3.18% by mol, (iii) the hydrogen concentration of 0.45% by mol in the mixed gas of ethylene and hydrogen continuously fed was changed to 0.42% by mol, and (iv) the polymerization time was changed to 60 minutes.

As a result, there was obtained 15 g of an olefin polymer. A polymerization activity per mol of a zirconium atom was $1.5 \times 10^7$ g/mol-Zr/hour, and that per g of the solid product was 2,100 g/g-solid product/hour. The obtained olefin polymer had SCB=7.9.

Comparative Example 2

(1) Production of Catalyst Component

Comparative Example 1 (1) was repeated except that (i) 88.0 ml of toluene was changed to 97.0 ml thereof, (ii) 12.5 ml (25.0 mmol of trimethylaluminum) of a toluene solution of trimethylaluminum was changed to 3.4 ml (25 mmol) of triethylaluminum, and (iii) 4.86 g of silica was changed to 4.89 thereof, thereby obtaining 6.45 g of a solid product. An elementary analysis of the solid product showed a result of Al=3.5 mmol/g and Si=12.1 mmol/g.

(2) Polymerization

Example 1 (2) was repeated except that (i) 7.3 mg of the component (A1) was changed to 7.0 mg of the solid product obtained in the above Comparative Example 2 (1), (ii) the gas composition in the system was changed to hydrogen=1.06% by mol and 1-butene=2.85% by mol, (iii) the hydrogen concentration of 0.45% by mol in the mixed gas of ethylene and hydrogen continuously fed was changed to 0.42% by mol, and (iv) the polymerization time was changed to 60 minutes.

As a result, there was obtained 12 g of an olefin polymer. A polymerization activity per mol of a zirconium atom was $1.2 \times 10^7$ g/mol-Zr/hour, and that per g of the solid product was 1,700 g/g-solid product/hour. The obtained olefin polymer had SCB=8.1.

Comparative Example 3

(1) Production of Catalyst Component

Into a 50 ml four necked flask purged with nitrogen, 17.0 ml of toluene and 2.05 g of the solid product obtained in the above Comparative Example 1 (1) were put, and the resultant mixture was cooled to 5° C. To the mixture, 3.5 ml (7.0 mmol) of a toluene solution (concentration=2.00 mol/liter) of pentafluorophenol was added dropwise over 0.5 hour. The mixture was stirred at 5° C. for one hour and then at 80° C. for two hours, in this order. The resultant solid was washed four times at 80° C. using a filter with 20.0 ml each of toluene, and then washed two times at room temperature using the same with 20.0 ml each of hexane, in this order. The washed solid was dried at 40° C. for one hour under a reduced pressure, thereby obtaining 2.60 g of a solid product.

(2) Polymerization

Example 1 (2) was repeated except that (i) 7.3 mg of the component (A1) was changed to 6.8 mg of the solid product obtained in the above Comparative Example 3 (1), (ii) the gas composition in the system was changed to hydrogen=1.06% by mol and 1-butene=3.52% by mol, (iii) the hydrogen concentration of 0.45% by mol in the mixed gas of ethylene and hydrogen continuously fed was changed to 0.46% by mol, and (iv) the polymerization time was changed to 30 minutes.

As a result, there was obtained 140 g of an olefin polymer. A polymerization activity per mol of a zirconium atom was $2.8 \times 10^8$ g/mol-Zr/hour, and that per g of the solid product was 41,000 g/g-solid product/hour. The obtained olefin polymer had SCB=20.4, MFR=7.5, MFRR=34 and SR=1.38.

Comparative Example 4

(1) Production of Catalyst Component

Comparative Example 3 (1) was repeated except that 2.05 g of the solid product was changed to 2.02 g of the solid product obtained in the above Comparative Example 2 (1), thereby obtaining 2.5 g of a solid product.

(2) Polymerization

Example 1 (2) was repeated except that (i) 7.3 mg of the component (A1) was changed to 6.7 mg of the solid product obtained in the above Comparative Example 4 (1), (ii) the gas composition in the system was changed to hydrogen=1.05% by mol and 1-butene=3.60% by mol, (iii) the hydrogen concentration of 0.45% by mol in the mixed gas of ethylene and hydrogen continuously fed was changed to 0.46% by mol, and (iv) the polymerization time was changed to 30 minutes.

As a result, there was obtained 160 g of an olefin polymer. A polymerization activity per mol of a zirconium atom was $3.2 \times 10^8$ g/mol-Zr/hour, and that per g of the solid product was 47,800 g/g-solid product/hour. The obtained olefin polymer had SCB=20.7, MFR=12.7 and SR=1.33.

The above-mentioned Examples, Reference Examples and Comparative Examples are summarized in the following Tables 1 and 2, wherein TMA, TEA, PFP, HFP and TFE mean trimethylaluminium, triethylaluminium, 1,1,1,3,3,3-hexafluoro-2-(trifluoromethyl)-2-propanol, 1,1,1,3,3,3-hexafluoro-2-propanol and 2,2,2-trifluoroethanol, respectively.

According to the present invention, there are provided in addition polymerized particle-producing polymerization:

(1) an efficient process for producing an addition polymer having (i) a satisfactorily high molecular weight and (ii) an excellent shape and particle property, (2) a process for producing a single site catalyst for addition polymerization used for producing said addition polymer, (3) a process for producing a modified article, a carrier or a catalyst component for addition polymerization used for producing said single site catalyst for addition polymerization, and (4) a process for producing a pre-polymerized catalyst component for addition polymerization used for producing said catalyst for addition polymerization.

TABLE 1

| | Example | | | | | | | |
|---|---|---|---|---|---|---|---|---|
| | 1 | 2 | 3 | 4 | 5 | 6 | 7 | 8 |
| Starting material | | | | | | | | |
| Compound (a) | TMA | TEA | TMA | TEA | TMA | TEA | TMA | TEA |
| Compound (b) | PFP | PFP | HFP | HFP | TFE | TFE | HFP | HFP |
| Compound (c) | Water | water | water | water | water | water | water | water |
| Particle (d) | silica | silica | silica | silica | silica | silica | silica | silica |
| Gas concentration (% by mol) | | | | | | | | |
| Hydrogen | 1.07 | 1.10 | 0.98 | 1.06 | 1.01 | 1.04 | 1.05 | 1.02 |
| 1-Butene | 3.42 | 3.47 | 3.52 | 3.67 | 3.09 | 3.05 | 3.62 | 3.57 |
| Polymerization activity | | | | | | | | |
| (g/mol-Zr/hour) | $3.8 \times 10^8$ | $1.3 \times 10^8$ | $9.7 \times 10^7$ | $8.2 \times 10^7$ | $2.5 \times 10^7$ | $1.5 \times 10^7$ | $7.8 \times 10^7$ | $1.2 \times 10^8$ |
| (g/g-solid catalyst component/hour) | 45,200 | 23,600 | 14,700 | 12,800 | 4,000 | 2,000 | 13,000 | 15,600 |
| Olefin polymer | | | | | | | | |
| SCB | 6.60 | 16.70 | 18.4 | 19.2 | 8.7 | 8.6 | 18.3 | 18.8 |
| MFR | 0.34 | 0.68 | 3.9 | 4.6 | 3.1 | 2.9 | 2.6 | 1.9 |
| MFRR | 80 | 74 | 40 | 44 | 28 | 27 | 49 | 52 |
| SR | 1.26 | 1.35 | 1.41 | 1.44 | 1.53 | 1.54 | 1.45 | 1.34 |

TABLE 2

| | Reference Example | | | Comparative Example | | | |
|---|---|---|---|---|---|---|---|
| | 1 | 2 | 3 | 1 | 2 | 3 | 4 |
| Gas concentration (% by mol) | | | | | | | |
| Hydrogen | 0 | 0 | 0 | 0.99 | 1.06 | 1.06 | 1.05 |
| 1-Butene | 8.18 | 7.31 | 8.20 | 3.18 | 2.85 | 3.52 | 3.60 |
| Polymerization activity | | | | | | | | |
| (g/mol-Zr/hour) | $1.2 \times 10^8$ | $1.6 \times 10^8$ | $8.1 \times 10^7$ | $1.5 \times 10^7$ | $1.2 \times 10^7$ | $2.8 \times 10^8$ | $3.2 \times 10^8$ |
| (g/g-solid catalyst component/hour) | — | — | — | 2,100 | 1,700 | 41,000 | 47,800 |
| Olefin polymer | | | | | | | | |
| SCB | 16.1 | 15.7 | 14.8 | 7.9 | 8.1 | 20.4 | 20.7 |
| MFR | 5.6 | 4.8 | 5.0 | — | — | 7.5 | 12.7 |
| MFRR | — | — | — | — | — | 34 | — |
| SR | — | — | — | — | — | 1.38 | 1.33 |

The invention claimed is:

1. A process for producing a modified particle, a carrier or a catalyst component for addition polymerization, which comprises the steps of:
   (1) contacting a compound (a) represented by the following formula (i) with a compound (b) represented by the following formula (ii), thereby producing a contact product, and
   (2) contacting the contact product with a porous material (d), and then with a compound (c) represented by the following formula (iii), in this contact order, $$M^1 L^1_3 \quad \text{(i)},$$

$$R^1_{t-1} TH \quad \text{(ii), and}$$

$$R^2_{t-2} TH_2 \quad \text{(iii)},$$

wherein $M^1$ is an Al atom; $L^1$ is a hydrogen atom, a hydrocarbon group or a halogen atom, and three $L^1$s are the same as or different from one another; $R^1$ is an electron-withdrawing group or an electron-withdrawing group-containing group, and when more than one $R^1$ exist, they are the same as or different from one another; $R^2$ is a hydrocarbon group or a halogenated hydrocarbon group; T is independently of each other a nitrogen or oxygen atom; and t is a number corresponding to the valence of T.

2. A process for producing a pre-polymerized catalyst for addition polymerization, which comprises the step of pre-polymerizing an olefin in the presence of a primary catalyst formed by contacting a modified particle (A) produced by the process according to claim 1 with a transition metal compound (B) and an organoaluminum compound (C).

3. A process for producing an addition polymer, which comprises the step of addition polymerizing an addition polymerizable monomer in the presence of a pre-polymerized catalyst for addition polymerization produced by the process according to claim 2.

4. A process for producing a catalyst for addition polymerization, which comprises the step of contacting a catalyst component for addition polymerization produced by the process according to claim 1 with a transition metal compound (B) and an organoaluminum compound (C).

5. A process for producing an addition polymer, which comprises the step of addition polymerizing an addition polymerizable monomer in the presence of a catalyst for addition polymerization produced by the process according to claim 4.

6. A process for producing a catalyst for addition polymerization, which comprises the step of contacting a catalyst component for addition polymerization produced by the process according to claim 1 with a transition metal compound (B).

7. A process for producing an addition polymer, which comprises the step of addition polymerizing an addition polymerizable monomer in the presence of a catalyst for addition polymerization produced by the process according to claim 6.

8. The process for producing an addition polymer according to claims 7 or 5, wherein the addition polymerizable monomer is an olefin.

9. The process for producing an addition polymer according to claims 7 or 5, wherein the addition polymerizable monomer is a combination of ethylene with an α-olefin.

10. The process for producing a catalyst for addition polymerization according to claims 6 or 4, wherein the transition metal compound (B) has at least one cyclopentadiene-containing anionic group.

11. A process for producing a pre-polymerized catalyst for addition polymerization, which comprises the step of pre-polymerizing an olefin in the presence of a primary catalyst formed by contacting a modified particle (A) produced by the process according to claim 1 with a transition metal compound (B).

12. A process for producing an addition polymer, which comprises the step of addition polymerizing an addition polymerizable monomer in the presence of a pre-polymerized catalyst for addition polymerization produced by the process according to claim 11.

13. A process for producing a pre-polymerized catalyst component for addition polymerization, which comprises the step of pre-polymerizing an olefin in the presence of a primary catalyst formed by contacting a modified particle (A) produced by the process according to claim 1 with a transition metal compound (B) and an organoaluminum compound (C).

14. A process for producing an addition polymer, which comprises the step of addition polymerizing an addition polymerizable monomer in the presence of a pre-polymerized catalyst component for addition polymerization produced by the process according to claim 13.

15. A process for producing a pre-polymerized catalyst component for addition polymerization, which comprises the step of pre-polymerizing an olefin in the presence of a primary catalyst formed by contacting a modified particle (A) produced by the process according to claim 1 with a transition metal compound (B).

16. A process for producing an addition polymer, which comprises the step of addition polymerizing an addition polymerizable monomer in the presence of a pre-polymerized catalyst component for addition polymerization produced by the process according to claim 15.

17. The process for producing an addition polymer according to any of claims 16, 14 or 12, wherein the addition polymerizable monomer is an olefin.

18. The process for producing an addition polymer according to any of claims 16, 14 or 12, wherein the addition polymerizable monomer is a combination of ethylene with an α-olefin.

19. A process for producing a catalyst for addition polymerization, which comprises the step of contacting a pre-polymerized catalyst component for addition polymerization produced by the process according to claims 15 or 13 with an organoaluminum compound (C).

20. A process for producing an addition polymer, which comprises the step of addition polymerizing an addition polymerizable monomer in the presence of a catalyst for addition polymerization produced by the process according to claim 19.

21. The process for producing an addition polymer according to claim 20, wherein the addition polymerizable monomer is an olefin.

22. The process for producing an addition polymer according to claim 20, wherein the addition polymerizable monomer is a combination of ethylene with an α-olefin.

* * * * *